(12) United States Patent
Kovács et al.

(10) Patent No.: US 10,111,138 B2
(45) Date of Patent: Oct. 23, 2018

(54) TRAFFIC CLASSIFICATION OVER THE BASE STATION SUBSYSTEM TRANSPORT NETWORK

(71) Applicant: Telefonaktiebolaget L M Ericsson (publ), Stockholm (SE)

(72) Inventors: Åkos Kovács, Stockholm (SE); Lars Johansson, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 14/781,858

(22) PCT Filed: Apr. 2, 2013

(86) PCT No.: PCT/SE2013/050361
§ 371 (c)(1),
(2) Date: Oct. 1, 2015

(87) PCT Pub. No.: WO2014/163541
PCT Pub. Date: Oct. 9, 2014

(65) Prior Publication Data
US 2016/0044542 A1 Feb. 11, 2016

(51) Int. Cl.
*H04W 72/08* (2009.01)
*H04W 28/18* (2009.01)
(Continued)

(52) U.S. Cl.
CPC .......... *H04W 28/18* (2013.01); *H04L 47/14* (2013.01); *H04L 47/2441* (2013.01);
(Continued)

(58) Field of Classification Search
CPC ..................... H04L 1/1614; H04L 1/1664
(Continued)

(56) References Cited

U.S. PATENT DOCUMENTS 7,697,422 B1 * 4/2010 Arad ............... H04L 47/10
370/229
9,807,644 B2 * 10/2017 Ma ................ H04W 28/0268
(Continued)

FOREIGN PATENT DOCUMENTS

EP 1096743 A1 5/2001
EP 2071778 A2 6/2009
(Continued)

OTHER PUBLICATIONS

Alcatel, "UL QoS Signalling in IP-Transport option", 3GPP TSG-RAN WG3, Meeting #37, R3-030960, Budapest, Hungaria, Aug. 25-29, 2003, pp. 1-4.
(Continued)

*Primary Examiner* — Asad M Nawaz
*Assistant Examiner* — Berhanu D Belete
(74) *Attorney, Agent, or Firm* — Sage Patent Group

(57) ABSTRACT

A method, performed by a base station (100) in a GSM/EDGE Radio Access Network, GERAN, of providing traffic classification for a data traffic flow, related to a General Packet Radio Service, GPRS, or Enhanced General Packet Radio Service, EGPRS. The method comprises the step of the base station (100) obtaining (S1), for the data traffic flow, a traffic-class-based network layer Quality of Service, QoS, attribute for traffic prioritization. The method also comprises the step of the base station (100) including (S2) the traffic-class-based network layer QoS attribute in data packets of the data traffic flow to provide network-layer traffic classification for the data traffic flow.

1 Claim, 21 Drawing Sheets

(51) Int. Cl.
  *H04L 12/801* (2013.01)
  *H04L 12/851* (2013.01)
  *H04W 72/04* (2009.01)
  *H04W 74/00* (2009.01)
  *H04W 88/02* (2009.01)
  *H04W 88/08* (2009.01)
  *H04W 88/12* (2009.01)

(52) U.S. Cl.
  CPC ....... *H04W 72/0406* (2013.01); *H04W 72/08* (2013.01); *H04W 74/002* (2013.01); *H04L 47/2408* (2013.01); *H04W 88/02* (2013.01); *H04W 88/08* (2013.01); *H04W 88/12* (2013.01)

(58) Field of Classification Search
  USPC .......................................................... 370/235
  See application file for complete search history.

(56) References Cited

U.S. PATENT DOCUMENTS

| | | | |
|---|---|---|---|
| 2002/0107908 A1* | 8/2002 | Dharanikota | H04L 41/5003 709/203 |
| 2003/0007453 A1* | 1/2003 | Ogier | H04L 47/17 370/229 |
| 2003/0039246 A1* | 2/2003 | Guo | H04L 45/302 370/389 |
| 2003/0058871 A1* | 3/2003 | Sastry | H04L 47/10 370/401 |
| 2004/0184426 A1* | 9/2004 | Tan | H04W 72/10 370/338 |
| 2004/0260951 A1 | 12/2004 | Madour | |
| 2005/0041584 A1 | 2/2005 | Lau et al. | |
| 2005/0044130 A1* | 2/2005 | Sillasto | H04L 41/5025 709/200 |
| 2005/0147041 A1* | 7/2005 | Zaki | H04L 47/14 370/235 |
| 2007/0097926 A1* | 5/2007 | Liu | H04L 47/10 370/335 |
| 2007/0178916 A1* | 8/2007 | Sorbara | H04L 1/0009 455/458 |
| 2007/0297450 A1 | 12/2007 | Smolinske et al. | |
| 2008/0151828 A1* | 6/2008 | Bjorken | H04W 72/044 370/329 |
| 2009/0285097 A1* | 11/2009 | So | H04Q 11/0062 370/235 |
| 2010/0278105 A1* | 11/2010 | Diachina | H04W 28/10 370/328 |
| 2011/0194445 A1* | 8/2011 | Riddington | H04L 1/0003 370/252 |
| 2012/0092992 A1* | 4/2012 | Pappas | H04L 47/2491 370/235 |
| 2012/0155298 A1* | 6/2012 | Yang | H04W 24/08 370/252 |
| 2012/0263041 A1* | 10/2012 | Giaretta | H04L 47/2441 370/236 |
| 2012/0303835 A1 | 11/2012 | Kempf et al. | |
| 2012/0314593 A1* | 12/2012 | Liu | H04L 47/18 370/252 |
| 2014/0064080 A1* | 3/2014 | Stevens | H04L 47/2441 370/235 |
| 2015/0009826 A1* | 1/2015 | Ma | H04W 28/0268 370/235 |
| 2016/0112896 A1* | 4/2016 | Karampatsis | H04W 28/0252 370/230.1 |
| 2018/0077072 A1* | 3/2018 | Liu | H04L 47/18 |

FOREIGN PATENT DOCUMENTS

| | | |
|---|---|---|
| WO | 0186885 A1 | 11/2001 |
| WO | 02054795 A2 | 7/2002 |
| WO | 2010133911 A1 | 11/2010 |

OTHER PUBLICATIONS

IPwireless, "The meaning of QoS Label", 3GPP TSG SA WG2 Architecture—#55, S2-063716, Busan, Korea, Oct. 23-27, 2006, pp. 1-6.

Koodli, Rajeev et al., "Supporting Packet-Data QoS in Next-Generation Cellular Networks", IEEE Communications Magazine, IEEE Service Center, Piscataway, US: 39 (2), Feb. 2001, pp. 180-188.

Priggouris, G. et al., "Supporting IP QoS in the General Packet Radio Service", IEEE Network, Sep./Oct. 2000, pp. 8-14.

Stuckmann, Peter, "Quality of Service Management in GPRS-Based Radio Access Networks", Telecommunications Systems 19:3, 4, 2002, pp. 515-546.

\* cited by examiner

TRAFFIC CLASSIFICATION OVER THE BASE STATION SUBSYSTEM TRANSPORT NETWORK

TECHNICAL FIELD

The present embodiments generally relate to wireless communication and, more particularly to a method and base station in a GSM/EDGE Radio Access Network, GERAN, for providing traffic classification for a data traffic flow, as well as a method and base station controller in a GSM/EDGE Radio Access Network, GERAN, for supporting traffic classification for a data traffic flow, as well as a method and network support node part of a GSM/EDGE Radio Access Network, GERAN, for supporting traffic classification for a data traffic flow.

BACKGROUND

GSM/EDGE Radio Access Network, GERAN, is a term given to the Global System for Mobile communications, GSM, radio access technology, including its evolutions in the form of Enhanced Data rates for Global Evolution, EDGE, and for most purposes, the General Packet Radio Service, GPRS.

General Packet Radio Service (GPRS) provides mobile users access to value-added services and different external packet switched networks. These networks can be, for example, the Internet or corporate intranets. The Base Station Subsystem (BSS) of the Global System for Mobile Communications (GSM) network provides the radio interface to mobile stations (MS) via the Base Transceiver Station (BTS) and a network interface to the GPRS core network. The GPRS core network handles mobility and access to external packet networks and services.

The GPRS core network is the central part of the general packet radio service (GPRS) which allows Universal Mobile Telecommunications systems (UMTS) mobile networks to transmit Internet Protocol (IP) packets to external networks such as the Internet. The GPRS is an integrated part of the GSM network switching subsystem and acts in parallel with the GSM network, providing packet switched connections to the external networks. One of the requirements of a GPRS network is that it must be able to support different Quality of Service (QoS) subscriptions of the user.

FIG. 1 shows a simple block diagram over the architecture of a GPRS network. The GPRS system has some new network elements compared to an existing GSM network. Some of these elements are GPRS Support Nodes (GSN) which are network nodes supporting the use of GPRS in the GSM core network. The Gateway GPRS Support Node (GGSN) 400 is responsible for the interworking between the GPRS network and external packet switched networks, like the Internet. The Serving GPRS Support node (SGSN) 300 corresponds to the Mobile Switching Center (MSC) 500 in a GSM network and is responsible for the delivery of data packets from and to the mobile stations within its geographical service area. The GGSN converts the GPRS packets coming from the SGSN into the appropriate Packet Data Protocol (PDP) format and sends them out on the corresponding packet data network. In the other direction, PDP addresses of incoming data packets are converted to the GSM address of the destination user. The readdressed packets are sent to the responsible SGSN.

The BSS 250 is responsible for handling traffic and signalling between a mobile station (MS) 10 and the network switching subsystem. The BSS comprises a Base Transceiver Station (BTS), for example a Radio Base Station (RBS) 100 which contains transceivers, antennas, and equipment for encrypting and decrypting communications with the Base Station Controller (BSC) 200. The BSC classically provides the intelligence behind the BTSs and handles allocation of radio channels, receives measurements from the MSs, and controls handovers from BTS to BTS.

The GPRS system introduces new interfaces to the GSM network. For example, the Gb interface connects the BSS to the SGSN in the GPRS core network and carries the GPRS traffic and signalling between the GSM radio network (BSS) and the GPRS network, the Abis interface is the interface between the BTS and BSC, and the Gn interface is an interface between two GSN nodes and supports the GPRS tunneling protocol.

The Packet Data Protocol (PDP) context is a data structure present on both the SGSN and the GGSN and contains the subscriber's session information when the subscriber has an active session. When a mobile station (MS) wants to use GPRS, it must first attach and then activate a PDP context. This allocates a PDP context data structure in the SGSN that the subscriber is currently visiting and the GGSN serving the subscriber's access point.

Differentiated Services of DiffServ is a computer networking architecture that specifies a simple, scalable and coarse-grained mechanism for classifying and managing network traffic and providing QoS on modern IP networks. DiffServ can, for example, be used to provide low-latency to critical network traffic such as voice or streaming media while providing simple best-effort service to non-critical services such as web traffic or file transfers. DiffServ uses the 6-bit Differentiated Services Field (DS field) in the IP header for packet classification purposes.

DiffServ operates on the principle of traffic classification, where each data packet is placed into a limited number of traffic classes, rather than differentiating network traffic based on the requirements of an individual flow. Each router on the network is configured to differentiate traffic based on its class. DiffServ-aware routers implement Per-Hop Behaviors (PHBs), which define the packet-forwarding properties associated with a class of traffic. Different PHBs may be defined to offer, for example, low-loss or low-latency. The PHB is determined by the DS field of the IP header. The DS field contains a 6-bit Differentiated Services Code Point (DSCP) value.

As schematically illustrated in FIG. 2, the MS sends a request to the SGSN for a certain level of QoS in a PDP Context Activation Request for each connection the MS want to use. Actual attributes and parameters are then subject to a negotiation procedure between the BSS (BSC) and the SGSN (Aggregate BSS QoS Profile (ABQP) procedures) based on the traffic type demanded by the end-user application and available resources. As a result, a QoS profile is created for the certain traffic class and appropriate resources (like, for example, Packet Data Channels (PDCHs)) are reserved for the air interface by the BSC. QoS attributes within the PDP contexts for each connection of a user application are stored in both the MS and in the GSN.

In case of legacy, non-IP BTSs, the actors of this process are the SGSN, BSC and the MS. At the end of the process, the MS is notified if the PDP context is accepted and what QoS Profile has been negotiated.

Each MS may have several Packet Flow Contexts (PFCs) associated with it, depending on the number of active PDP contexts and the QoS profile of each PDP context. Each PFC is identified by the Packet Flow Identifier (PFI) which is assigned by the SGSN. For each MS, the BSS will store the ABQPs for the PFCs of that MS and the ABQP may then be addressed via the PFI, if the MS supports this.

PFI is signaled within the Radio Link Control (RLC) Uplink Data Block. PFI itself cannot identify the traffic type since the same traffic class may use different PFI values according to the fact that these flows may belong to different PDP contexts.

The IP Radio Access Network (RAN) transport network (Abis interface) and the core network (Gb interface) are not aware of what the QoS is of the traffic they actually carry. Thus all traffic types over the (E)GPRS service may be considered as the same and classified as the same Differentiated Services (DiffServ) Per Hop Behaviour (PHB).

The technical specification of Radio Link Control/Medium Access Control (RLC/MAC) protocol for GPRS over the MS-BSS interface is described in detail in 3GPP TS 44.060: General Packet Radio Service (GPRS), Mobile Station (MS)-Base Station System (BSS) interface, Radio Link Control/Medium Access Control (RLC/MAC) protocol.

In the past, the radio interface was considered to be a bottleneck. Current QoS architecture provides a solution to overcome this technical barrier. However, due to the expected increase in traffic from future all-IP multistandard sites, QoS comes even more in focus. Now, it is important that data traffic irrespective of whether generated by LTE, WCDMA or GSM will receive the same handling over the IP networks.

Streaming applications generate the major part of data traffic in cellular networks. Streaming may not only be a simple file download. Inelastic traffic is sensitive to delay and jitter. Without proper traffic management it is impossible to meet these requirements.

According to current trends, (E)GPRS services will take part more and more in serving the continuously increasing data traffic.

Thus, it would be desirable to provide improvements related to data traffic management in a wireless communication network, in particular an (E)GPRS network.

SUMMARY

It is an object to provide a method and a base station in a GSM/EDGE Radio Access Network, GERAN, for providing traffic classification for a data traffic flow.

It is also an object to provide a method and a base station controller in a GSM/EDGE Radio Access Network, GERAN, for supporting traffic classification for a data traffic flow.

It is another object to provide a method and a network support node part of a GSM/EDGE Radio Access Network, GERAN, for supporting traffic classification for a data traffic flow in a transport network.

These and other objects are met by the invention as defined by the accompanying patent claims.

An aspect relates to a method performed by a base station in a GSM/EDGE Radio Access Network, GERAN, of providing traffic classification for a data traffic flow, related to a General Packet Radio Service, GPRS, or Enhanced General Packet Radio Service, EGPRS. The method comprises the step of the base station obtaining, for the data traffic flow, a traffic-class-based network layer Quality of Service, QoS, attribute for traffic prioritization. The method also comprises the step of the base station including the traffic-class-based network layer QoS attribute in data packets of the data traffic flow to provide network-layer traffic classification for the data traffic flow.

Another aspect relates to a base station in a GSM/EDGE Radio Access Network, GERAN, wherein the base station is configured to provide traffic classification for a data traffic flow, related to a General Packet Radio Service, GPRS, or Enhanced General Packet Radio Service, EGPRS. The base station comprises an obtainer configured to obtain, for the data traffic flow, a traffic-class-based network layer Quality of Service, QoS, attribute for traffic prioritization. The base station also comprises an includer configured to include the traffic-class-based network layer QoS attribute in data packets of the data traffic flow to provide network-layer traffic classification for the data traffic flow.

A further aspect relates to a method, performed by a base station controller in a GSM/EDGE Radio Access Network, GERAN, of supporting traffic classification for a data traffic flow, related to a General Packet Radio Service, GPRS, or Enhanced General Packet Radio Service, EGPRS. The method comprises the step of the base station controller obtaining a traffic-class-based network layer Quality of Service, QoS, attribute for traffic prioritization to be used for said data traffic flow. The method also comprises the step of the base station controller signalling the traffic-class-based network layer Quality of Service, QoS, attribute to a base station to enable network-layer traffic classification for the data traffic flow.

Yet another aspect relates to a base station controller in a GSM/EDGE Radio Access Network, GERAN, wherein the base station controller is configured to support traffic classification for a data traffic flow, related to a General Packet Radio Service, GPRS, or Enhanced General Packet Radio Service, EGPRS. The base station controller comprises an obtainer configured to obtain a traffic-class-based network layer Quality of Service, QoS, attribute for traffic prioritization to be used for the data traffic flow. The base station controller also comprises a signaller configured to signal the traffic-class-based network layer Quality of Service, QoS, attribute to a base station to enable network-layer traffic classification for the data traffic flow.

Still another aspect relates to a method, performed by a network support node part of a GSM/EDGE Radio Access Network, GERAN, of supporting traffic classification for a data traffic flow, related to a General Packet Radio Service, GPRS, or Enhanced General Packet Radio Service, EGPRS. The method comprises the step of the network support node receiving traffic class information representative of the traffic class of an end-user application of an associated mobile station. The method also comprises the step of the network support node determining, based on the traffic class information, a traffic-class-based network layer Quality of Service, QoS, attribute for traffic prioritization to be used for the data traffic flow by translating the traffic class information into the traffic-class-based network layer QoS attribute. The method further comprises the step of the network support node signalling the traffic-class-based network layer QoS attribute to a base station controller or an associated base station to enable network-layer traffic classification for the data traffic flow.

Yet another aspect relates to a network support node part of a GSM/EDGE Radio Access Network, GERAN, wherein the network support node is configured to support traffic classification for a data traffic flow, related to a General Packet Radio Service, GPRS, or Enhanced General Packet Radio Service, EGPRS. The network support node comprises a receiver configured to receive traffic class information representative of the traffic class of an end-user application of an associated mobile station. The network node also comprises a determiner configured to determine, based on the traffic class information, a traffic-class-based network layer Quality of Service, QoS, attribute for traffic prioritization to be used for the data traffic flow by translating the traffic class information into the traffic-class-based network layer QoS attribute. The network support node further comprises a signaller configured to signal the traffic-class-based network layer QoS attribute to a base station controller or an associated base station to enable network-layer traffic classification for the data traffic flow.

In this way, the proposed technology provides and/or supports network-layer traffic classification for a data traffic flow.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
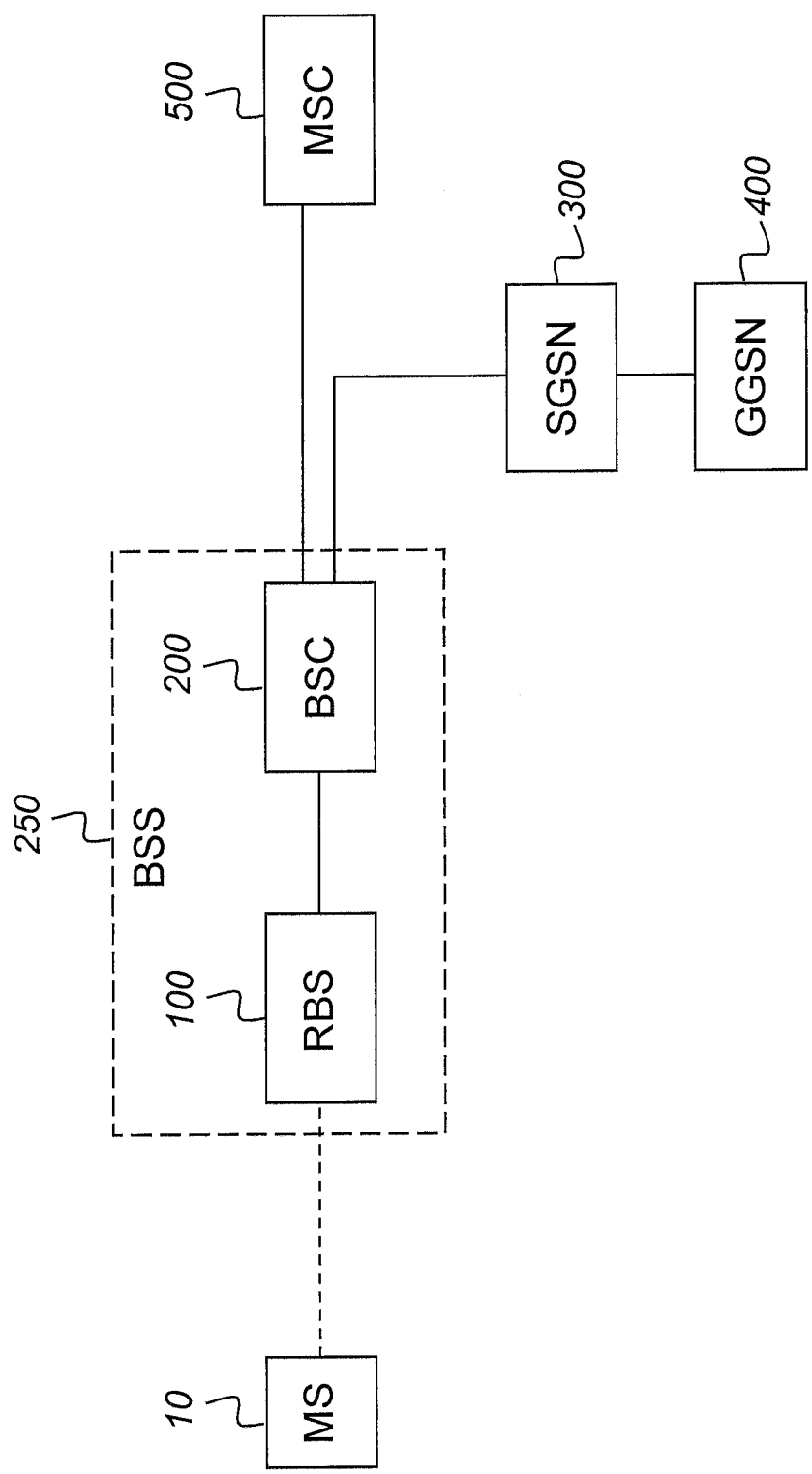
FIG. 1 is a schematic illustration of a GPRS network.
Figure 2:
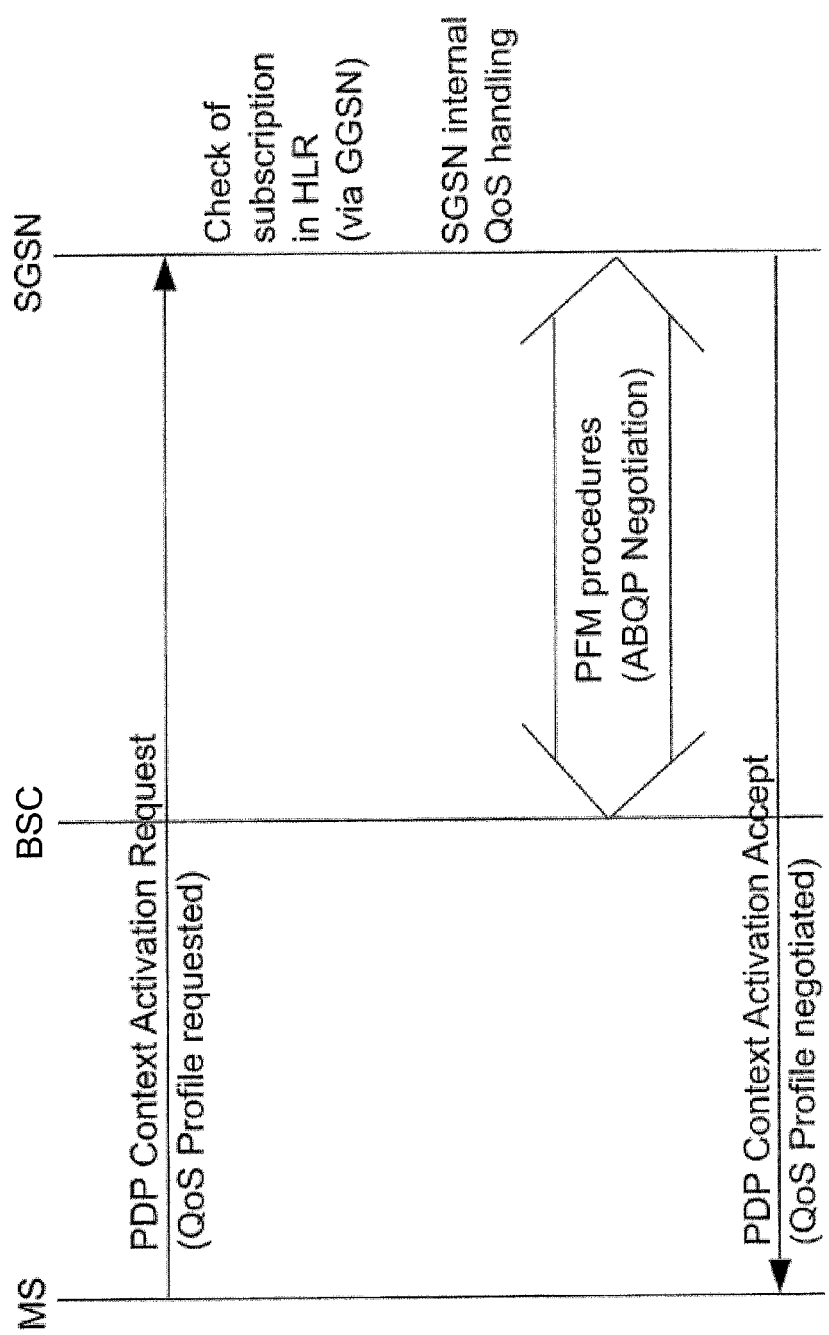
FIG. 2 is a schematic illustration of PDP context activation and QoS profile negotiation in a GPRS network.

The present embodiments generally relate to wireless communication and, more particularly to a method and base station for providing traffic classification for a data traffic flow in a transport network, as well as a method and base station controller for supporting traffic classification for a data traffic flow in a transport network, as well as a method and network support node for supporting traffic classification for a data traffic flow in a transport network.

Throughout the drawings, the same reference numbers are used for similar or corresponding elements.

Data traffic management has been extensively developed for modern radio access technologies such as Universal Terrestrial Radio Access Network, UTRAN, and Evolved UTRAN, E-UTRAN. Some current examples include:

European Patent Application EP1096743 A1 describes a Service based (Per-Class QoS Profile) QoS Framework for General Packet Radio Service/Universal Mobile Telecommunications systems (GPRS/UMTS). For each mobile station/user equipment (MS/UE), multimedia flows are classified and grouped into a set of QoS Classes. Flows of different QoS Classes are identified and differentiated to meet the specific transmission requirement of each QoS Class. Flows of the same QoS Class will be processed and forwarded across the network in the same way to meet their QoS specifications.

US Patent Application US2007/0097926 A1 describes a method for using DiffServ to implement the IP packet classification and the marking of a DSCP for the QoS in the wireless access network of the IP-based UMTS. The invention makes a classification to the data stream which is outgoing from the Iub interface at the NodeB side, data stream which is outgoing from the Iub interface at the Radio Network Controller (RNC) side and data stream which is outgoing from the Iur interface at the RNC side according to the direction and the process of the respective data streams, and assigns and adjusts the priority of the data stream classified according to the principles for optimizing QoS and radio resources. When the network is congested, the data stream with a high level will have a higher priority than that with a lower level in queue and source occupancy, and the packet with a lower priority in the same queue is discarded.

The article "Supporting Packet-Data QoS in Next-Generation Cellular Networks" by R. Koodil and M. Puuskari published in IEEE Communications Magazine February 2001, IEEE Service Center, Piscataway, US, 39, 2 180-188, ISSN 0163-6804 describes packet data QoS architecture and specific mechanisms that are being defined for multi-service QoS provisioning in the UMTS. The article describes the UMTS core network QoS issues, such as supporting DiffServ, QoS inter-working and external network QoS parameter mapping.

The article "Quality of Service Management in GPRS-Based Radio Access Networks" by P. Stuckmann published in Telecommunications Systems 19:3, 4, 515-546, 2002 examines the performance and capacity gain achievable with QoS management in packet switched radio networks based on the GPRS. The feasibility of QoS provisioning in mobile core networks with use of DiffServ compared to present IP technology realizing a pure Best-effort service is also examined. The article shows that DiffServ is able to support service differentiation, which is done in the radio network based on GPRS QoS classes, also in the core network.

The article "UL QoS Signalling in IP-Transport option" by Alcatel (3GPP Draft; R3-030960_UL_QOS_IPTR—20030820—$3^{rd}$ Generation Partnership Project (3GPP), Mobile Competence Centre; 650, route des Lucioles; F-06921 Sophia-Antipolis Cedex; France, RAN WG3, Budapest, Hungary; 20030820) discusses Transport Network Layer (TNL) QoS notification alternatives via signalling within a Code Division Multiple Access (CDMA) radio network system, and how to configure the mapping if any. It is concluded that TNL QoS information must be used at least for mandatory QoS mechanism, which is DiffServ marking in the Universal Terrestrial Radio Access Network (UTRAN). The TNL QoS information could be DiffServ Code Point (DSCP) or a generic TNL QoS parameter. Using DSCP has the advantage to avoid a mapping table at the Node B side.

The article "The meaning of QoS Label" by IPWireless (3GPP Draft; S2-063716_QoS, —20061017—$3^{rd}$ Generation Partnership Project (3GPP), Mobile Competence Centre; 650, route des Lucioles; F-06921 Sophia-Antipolis Cedex; France, SA WG2) discusses a QoS label within an Long-Term Evolution (LTE) radio network system. The QoS label is used for identifying the QoS treatment that the traffic aggregate of a particular service class will experience throughout the network elements. The article proposes a DiffServ approach for the QoS architecture.

However, there exist no efficient solutions for such traffic management in GERAN networks.

The article "Supporting IP QoS in the General Packet Radio Service" by G. Priggouris, S. Hadjiefthymiades and L. Merakos published in IEEE Network September/October 2000, 14, 5, August 17, ISSN 10.1109/65.871335 describes schemes for enhancing the GPRS architecture with the existing IP QoS support architectures, IntSery and DiffServ. Solutions are proposed to the problem of establishing QoS reservations across the GPRS core network, and the required signalling enhancements and modifications in the components of the GPRS architecture are identified. In the proposed DiffServ solution each type of service class will guarantee a specific QoS treatment in the chain MS-SGSN-GGSN.

The inventors, however, have recognized that existing QoS solution in GERAN does not consider network layer QoS, but is rather designed for end-to-end (E2E) usage and to provide QoS over the air interface.

A careful analysis by the inventors reveals that at least part of the problem derives from the fact that the GERAN transport network is actually not aware of the actual traffic type it carries. For example, the Packer Flow Identifier, PFI, value is transmitted in a data block that corresponds to a protocol layer considered as an application layer of the network layer (IP) in the protocol stack. ABQPs have meaning only for the BSC in the BSS and for the SGSN. In particular, this implies that there exists no real DiffServ-based traffic classification.

In the past, the radio interface was considered to be a bottleneck. Current QoS architectures provide a solution to overcome this technical barrier. However, future all-IP multistandard RBS nodes can provide E2E IP connectivity up to the GSN. Due to the expected tremendous amount of traffic from these multistandard sites, QoS becomes even more in focus. Now, it is important that data traffic irrespective of whether generated by LTE, WCDMA or GSM will receive the same handling over the IP networks.

Streaming applications generate the major part of data traffic in cellular networks. Streaming may not only be a simple file download. Inelastic traffic is sensitive to delay and jitter. Without proper traffic management it is impossible to meet these requirements. Moreover, in case of real-time interactive services traffic management in both uplink and downlink directions are important.

According to current trends, GPRS services over the GERAN network will take part more and more in serving the continuously increasing data traffic generated.

Thus, it would be desirable to provide improvements related to data traffic management in a GERAN network, in particular for (E)GPRS services.

Figure 3:
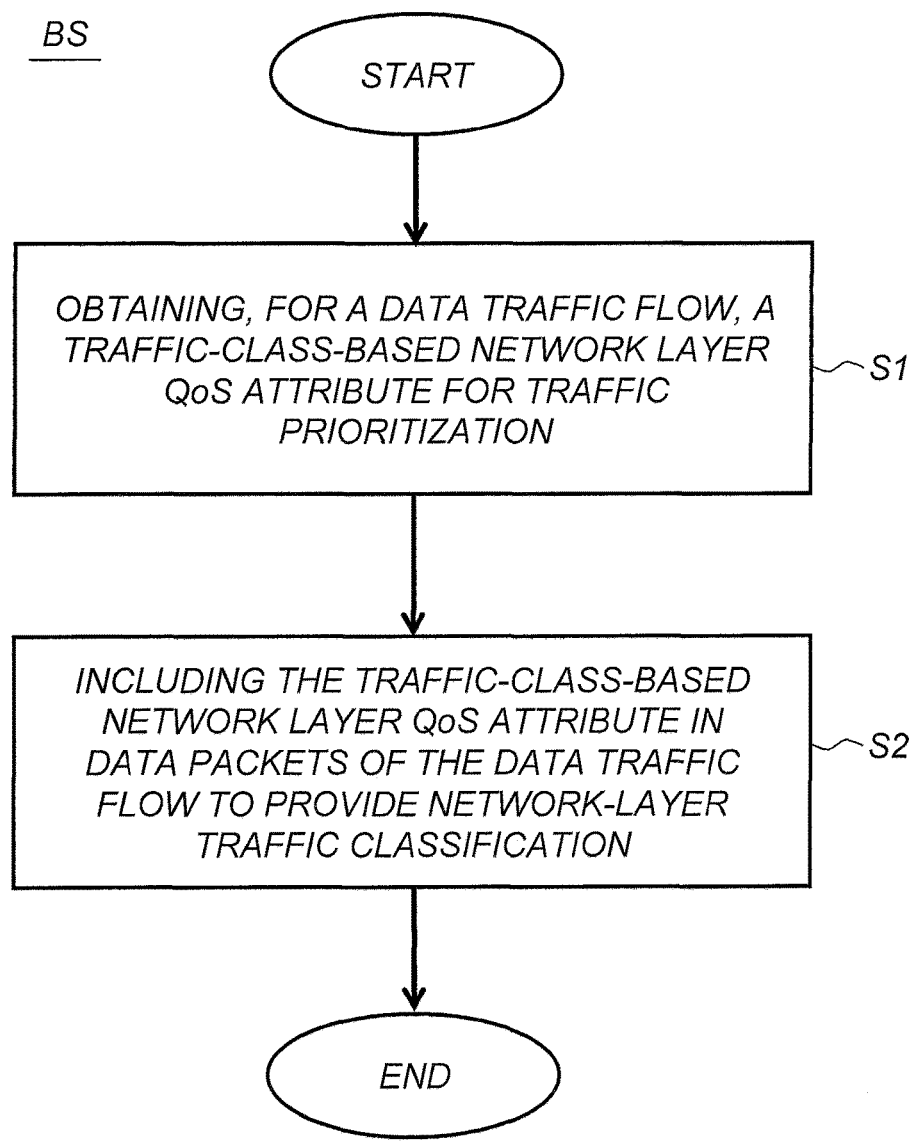
FIG. 3 is a flow chart showing an example of a method, in a base station, of providing traffic classification for a data traffic flow in a transport network according to an embodiment.

As schematically illustrated in FIG. 3, there is provided a method performed by a base station in a GSM/EDGE Radio Access Network, GERAN, of providing traffic classification for a data traffic flow, related to a General Packet Radio Service, GPRS, or Enhanced General Packet Radio Service, EGPRS. The method comprises the step S1 of the base station obtaining, for the data traffic flow, a traffic-class-based network layer Quality of Service, QoS, attribute for traffic prioritization. The method also comprises the step S2 of the base station including the traffic-class-based network layer QoS attribute in data packets of the data traffic flow to provide network-layer traffic classification for the data traffic flow.

In general, the traffic-class-based QoS attribute is understandable on the network layer of the transport network, and can then be used for proper traffic management in the network.

In a particular embodiment of the method illustrated in FIG. 3, the traffic-class-based network layer QoS attribute includes a DiffServ Code Point (DSCP) value. In this way, DiffServ-based traffic classification is provided in the base station.

For example, the traffic-class-based network layer QoS attribute, such as a DSCP value, may be used on the Internet Protocol, IP, layer in a future all-IP based radio base station in a GSM/EDGE Radio Access Network, GERAN, for classifying data packets of a given data traffic flow.

Figure 4:
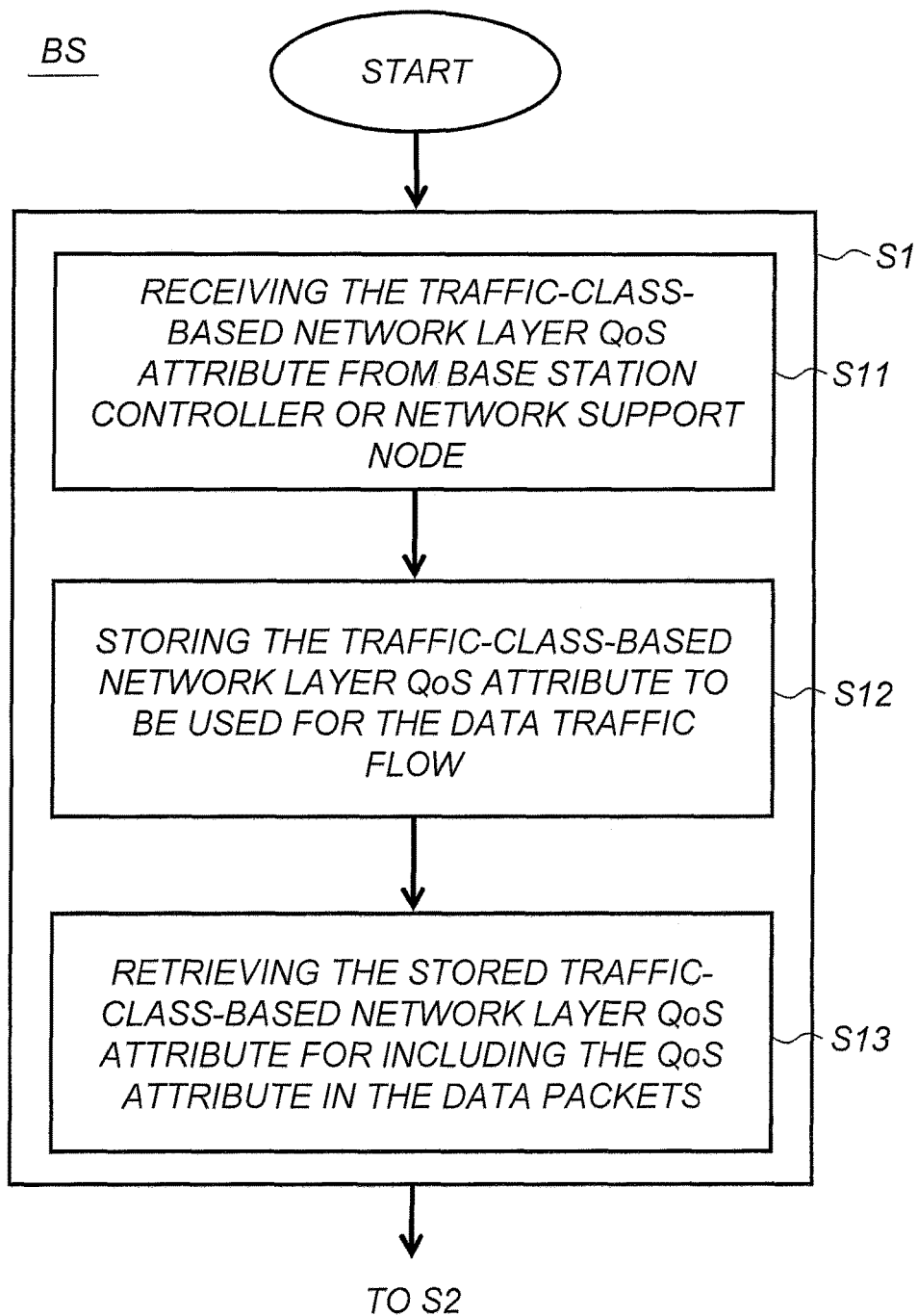
FIG. 4 is a flow chart showing a particular example of the obtaining step in FIG. 3 according to an embodiment.

FIG. 4 is a flow chart showing a particular example of the obtaining step in FIG. 3 according to an embodiment. In this particular example, the step S1 comprises the steps S11-S13. In step S11, the base station is receiving the traffic-class-based network layer QoS attribute for the data traffic flow from the base station controller or a network support node. In step S12, the base station is storing the traffic-class-based network layer QoS attribute to be used for the data traffic flow. In step S13, the base station is subsequently retrieving the stored traffic-class-based network layer QoS attribute for including the traffic-class-based network layer QoS attribute in the data packets of the data traffic flow.

Figure 5:
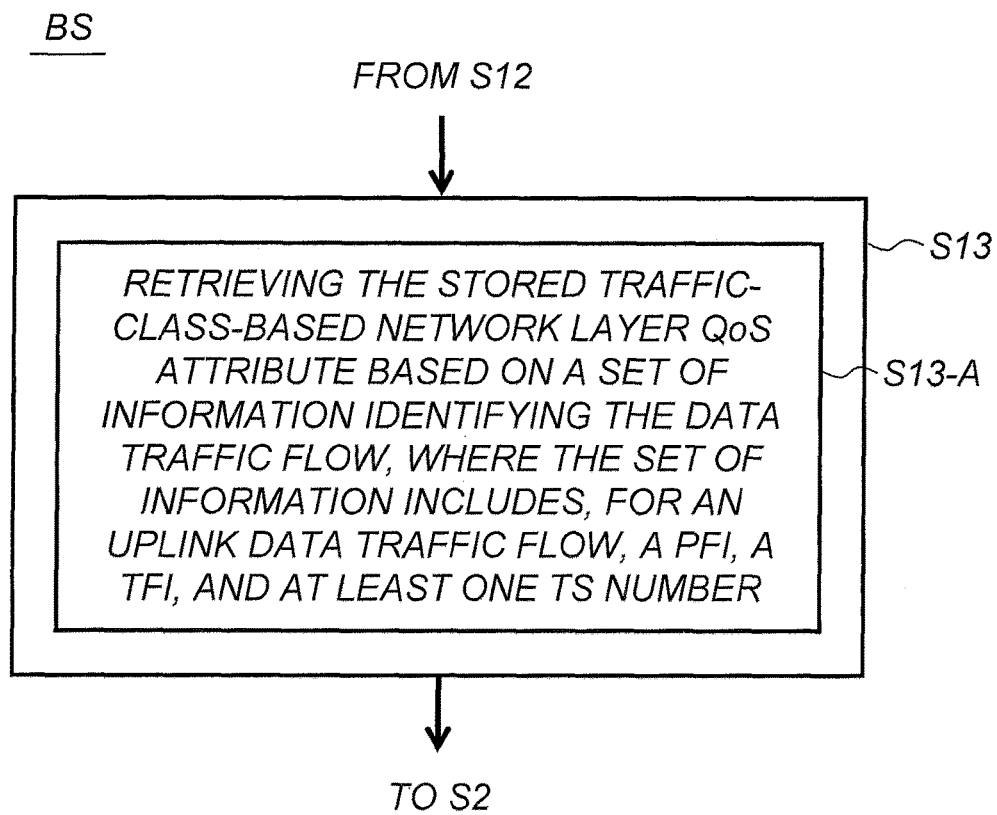
FIG. 5 is a flow chart showing a particular example of the retrieving step in FIG. 4 according to an embodiment.

FIG. 5 is a flow chart showing a particular example of the retrieving step in FIG. 4 according to an embodiment. In this particular example, the step S13 comprises the step S13-A. In step S13A the base station is retrieving the stored traffic-class-based network layer QoS attribute based on a set of information identifying the data traffic flow. This set of information identifying the data traffic flow includes, for an uplink data traffic flow, a Packet Flow Identifier (PFI) a Temporary Flow Identifier (TFI), and at least one Time Slot (TS) number Here, the traffic-class-based network layer QoS attribute is previously assigned with reference to the set of information by the base station controller.

Figure 6:
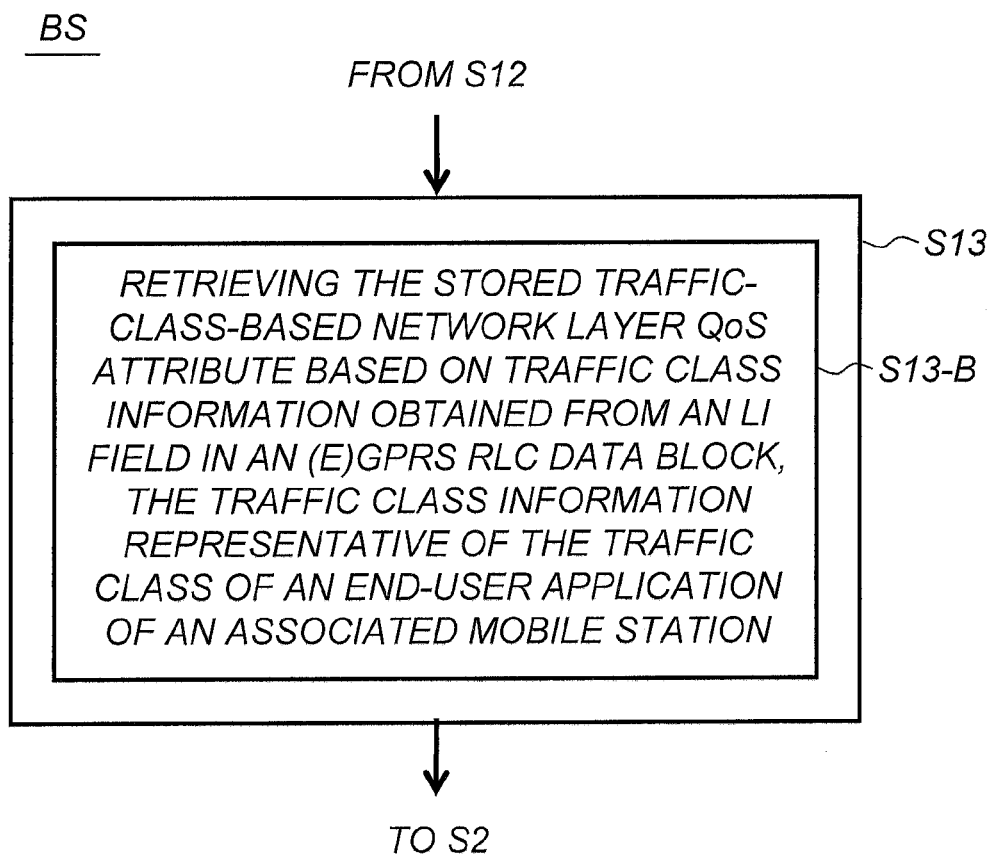
FIG. 6 is a flow chart showing another particular example of the retrieving step in FIG. 4 according to an embodiment.

FIG. 6 is a flow chart showing another particular example of the retrieving step in FIG. 4 according to an embodiment. In this particular example, the step S13 comprises the step S13-B. In step S13-B, the base station is retrieving the stored traffic-class-based network layer QoS attribute based on traffic class information obtained from a length indicator (LI) field in a GPRS or EGPRS Radio Link Control Data Block. This traffic class information is representative of the traffic class of an end-user application of an associated mobile station. Here, the traffic-class-based network layer QoS attribute is previously assigned with reference to the traffic class information by the base station controller or the network support node.

Figure 7:
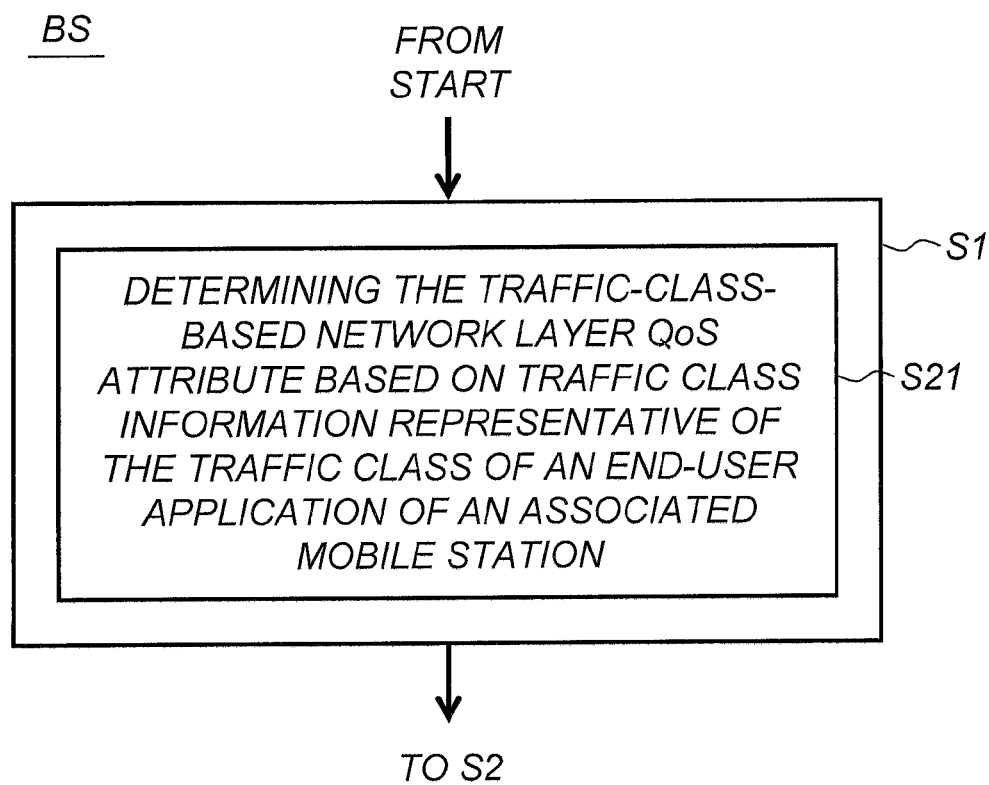
FIG. 7 is a flow chart showing another particular example of the obtaining step in FIG. 3 according to an embodiment.

FIG. 7 is a flow chart showing another particular example of the obtaining step in FIG. 3 according to an embodiment. In this particular example, the step S1 comprises the step S21 of the base station determining the traffic-class-based network layer Quality of Service, QoS, attribute based on traffic class information representative of the traffic class of an end-user application of an associated mobile station. Hence, instead of receiving the QoS attribute, the base station may determine the QoS attribute itself.

In a particular example, it is proposed to use the above embodiments on a per-user, per-application basis.

Figure 8:
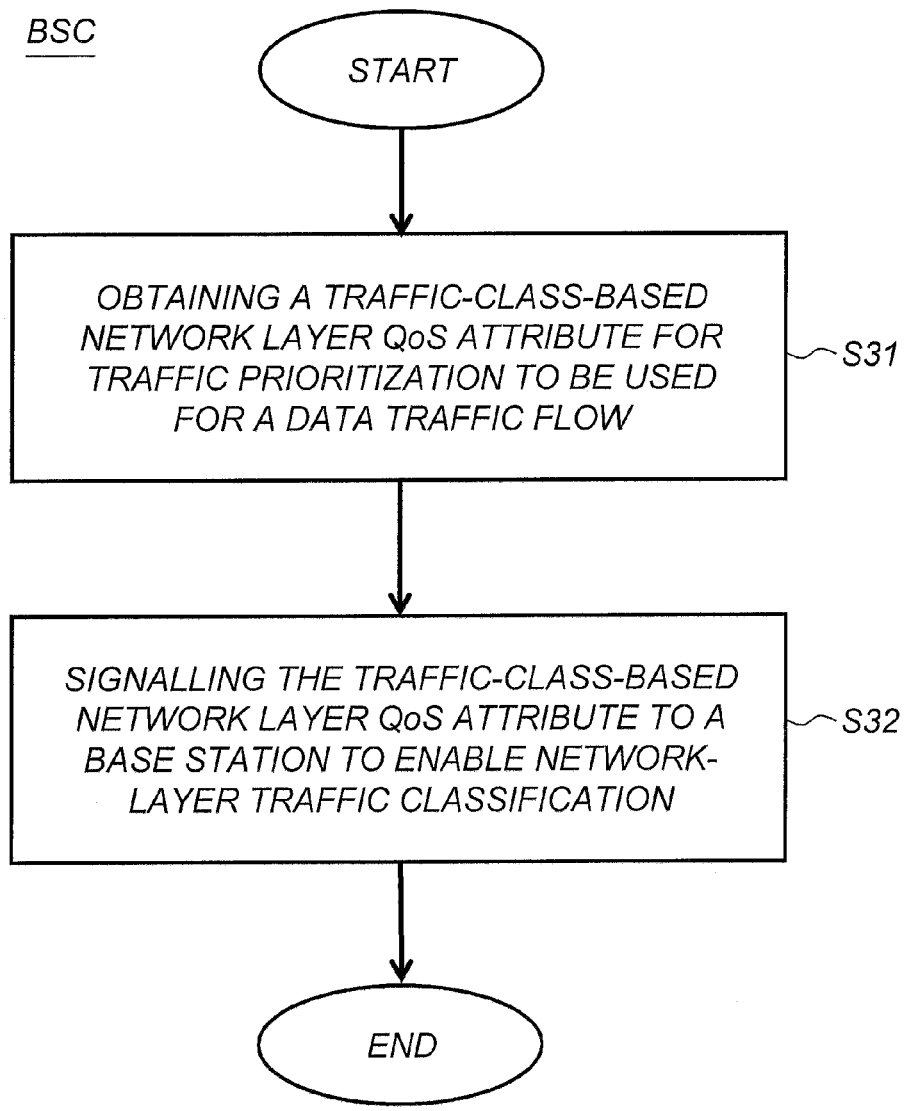
FIG. 8 is a flow chart showing an example of a method, in a base station controller, of supporting traffic classification for a data traffic flow in a transport network according to an embodiment.

As schematically illustrated in FIG. 8, there is provided a method, performed by a base station controller in a GSM/EDGE Radio Access Network, GERAN, of supporting traffic classification for a data traffic flow, related to a General Packet Radio Service, GPRS, or Enhanced General Packet Radio Service, EGPRS. The method comprises the step S31 of the base station controller obtaining a traffic-class-based network layer Quality of Service, QoS, attribute for traffic prioritization to be used for said data traffic flow. The method also comprises the step S32 of the base station controller signalling the traffic-class-based network layer Quality of Service, QoS, attribute to a base station to enable network-layer traffic classification for the data traffic flow.

In a particular embodiment of the method illustrated in FIG. 8, the traffic-class-based network layer QoS attribute includes a DiffServ Code Point, DSCP, value. In this way, DiffServ-based traffic classification is provided and/or supported in GERAN.

Figure 9:
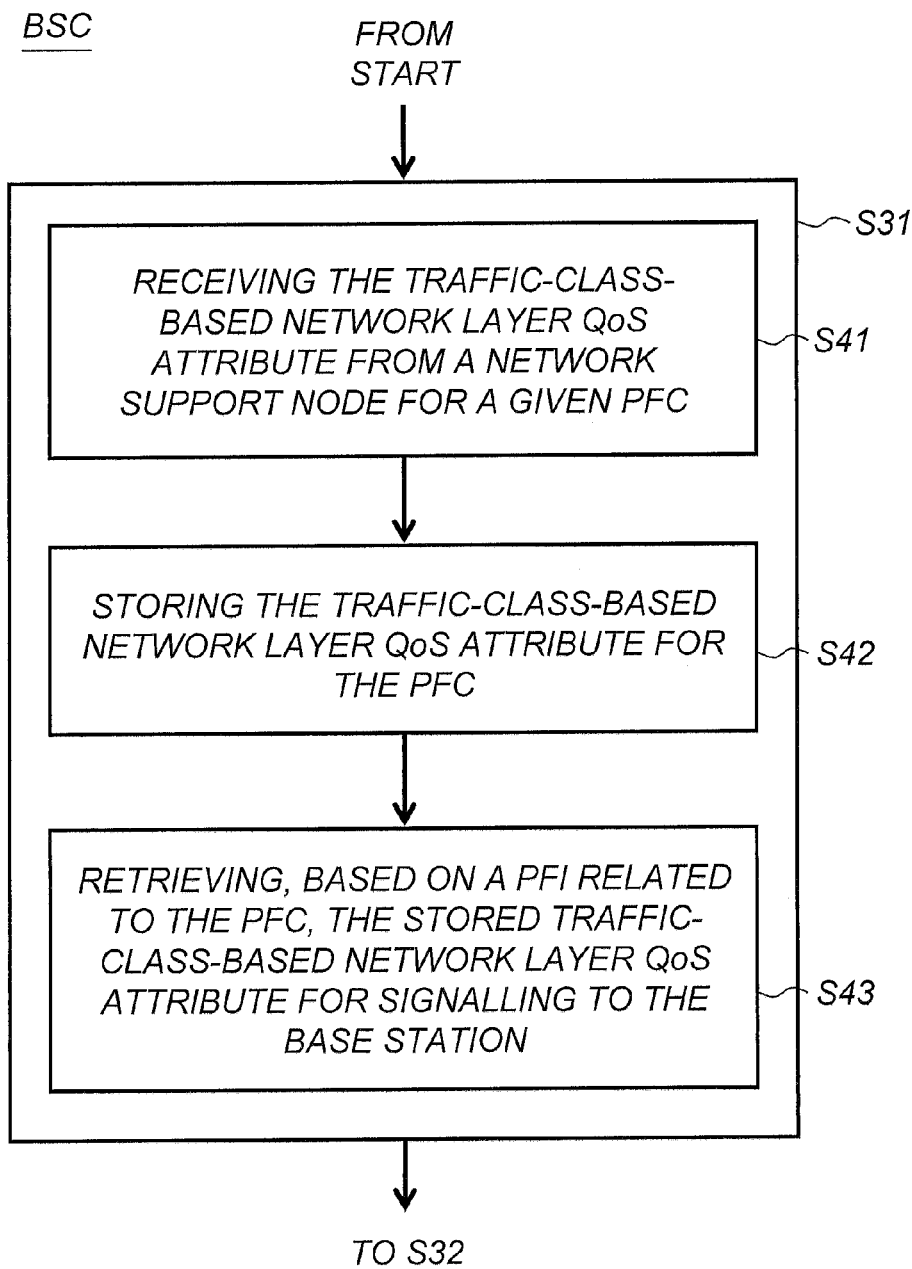
FIG. 9 is a flow chart showing a particular example of the obtaining step in FIG. 8 according to an embodiment.

FIG. 9 is a flow chart showing a particular example of the obtaining step in FIG. 8 according to an embodiment. In this particular example, the step S31 comprises the steps S41-S43. In step S41, the base station controller is receiving the traffic-class-based network layer QoS attribute from a network support node for a given Packet Flow Context, PFC, for the data traffic flow. In step S42, the base station controller is storing the traffic-class-based network layer QoS attribute for the given PFC. In step S43, the base station controller is subsequently retrieving, based on a Packet Flow Identifier, PFI, related to the PFC, the stored traffic-class-based network layer QoS attribute for signalling to the base station. The traffic-class-based network layer QoS attribute has previously being assigned with reference to the PFI by the network support node.

Figure 10:
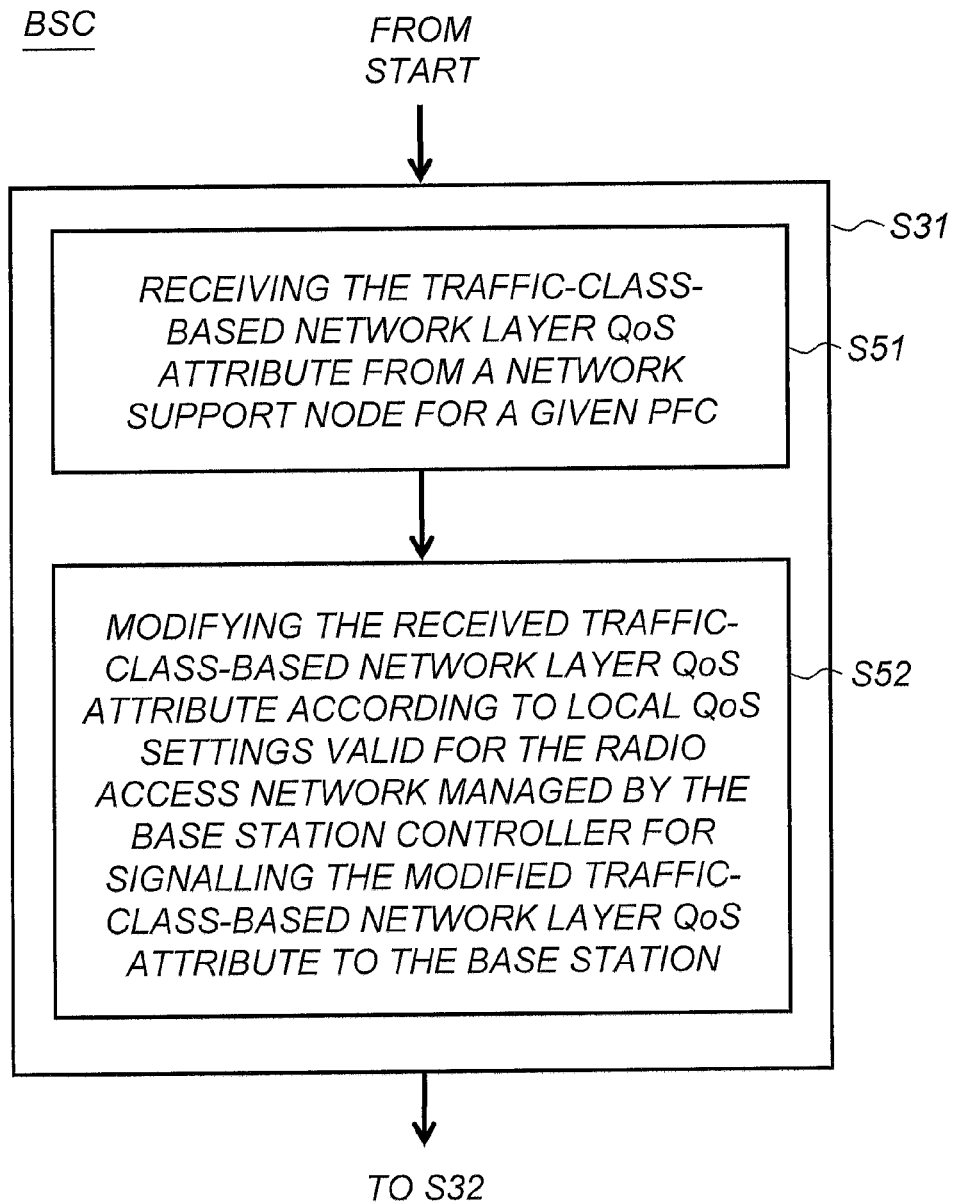
FIG. 10 is a flow chart showing another particular example of the obtaining step in FIG. 8 according to an embodiment.

FIG. 10 is a flow chart showing another particular example of the obtaining step in FIG. 8 according to an embodiment. In this particular example, the step S31 comprises the steps S51-S52. In step S51, the base station controller is receiving the traffic-class-based network layer QoS attribute from a network support node for a given Packet Flow Context, PFC, for the data traffic flow. In step S52, the base station controller is modifying the received traffic-class-based network layer QoS attribute according to local QoS settings valid for the radio access network managed by the base station controller for signalling the modified traffic-class-based network layer QoS attribute to the base station.

It may be the case that there are different QoS domains: one of the RBS-BSC, and another one for the BSC-SGSN. Expressed differently, the first one may be the QoS domain for the multi-standard Radio Access Network, RAN, and the latter one may be for the core network. These two networks, the RAN and the core network, are not always maintained by the same operator. This is one of the reasons why it is important to set the traffic-class-based network layer QoS attribute, e.g. DSCP, properly in both domains. If the same QoS attribute that was set in the core network is used all the way, it may have a different meaning in the RAN and this could result in improper traffic handling. Therefore it may be important to modify the QoS attribute according to local QoS settings valid for the RAN.

Figure 11:
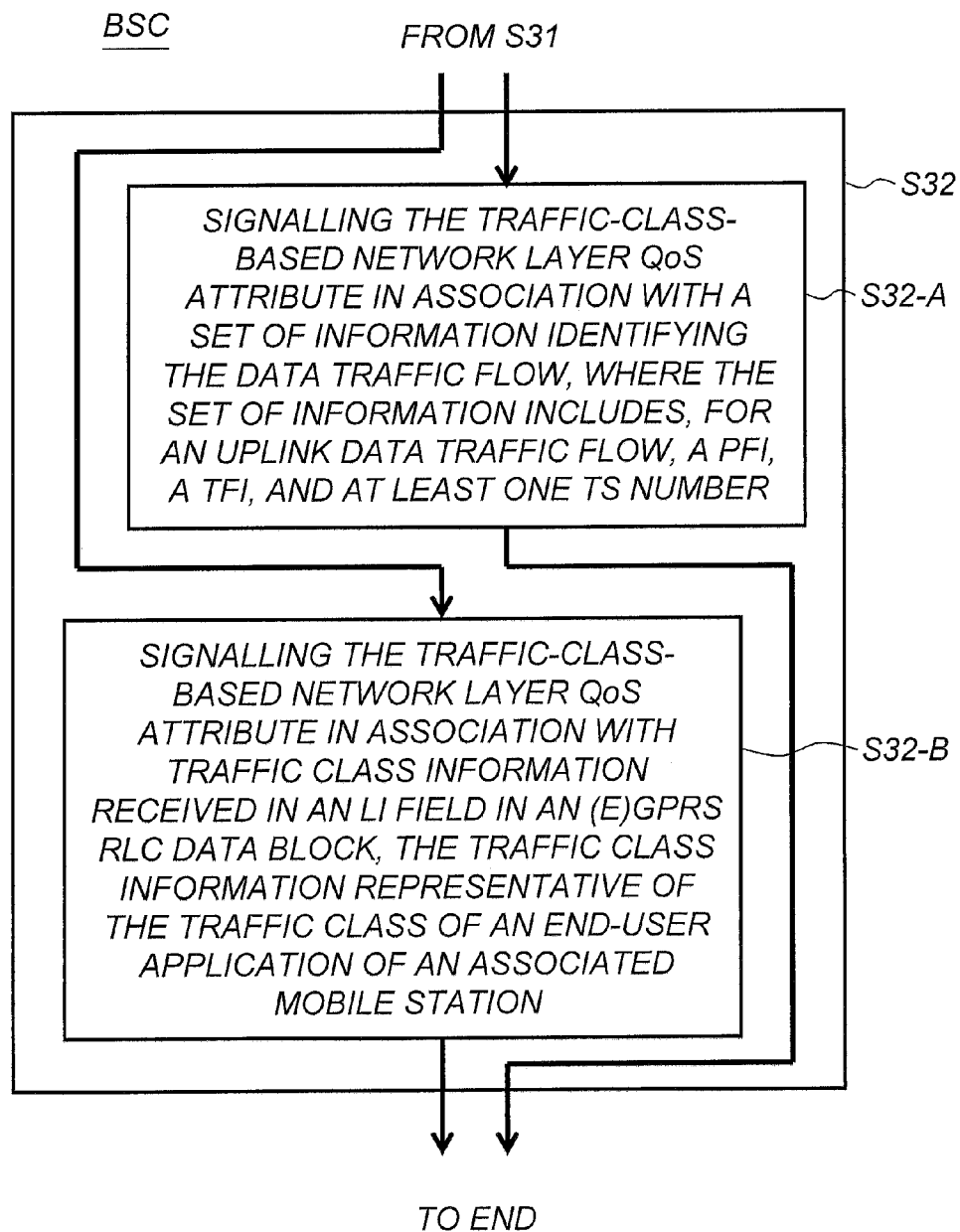
FIG. 11 is a flow chart showing two particular examples of the signalling step in FIG. 8 according to two different embodiments.

FIG. 11 is a flow chart showing two particular examples of the signalling step in FIG. 8 according to two different embodiments. By way of example, the step S32 may comprise the step S32-A of signalling the traffic-class-based network layer Quality of Service, QoS, attribute in association with a set of information identifying the data traffic flow. This set of information identifying the data traffic flow includes, for an uplink data traffic flow, a Packet Flow Identifier (PFI), a Temporary Flow Identifier (TFI), and at least one Time Slot (TS) number.

As an alternative, the step S32 may comprise the step S32-B of signalling the traffic-class-based network layer Quality of Service, QoS, attribute in association with traffic class information received in a length indicator (LI) field in a GPRS or EGPRS Radio Link Control Data Block. The traffic class information is representative of the traffic class of an end-user application of an associated mobile station.

According to yet another particular example, the base station controller, BSC, is obtaining the traffic-class-based network layer Quality of Service, QoS, attribute by determining the traffic-class-based network layer Quality of Service, QoS, attribute based on traffic class information representative of the traffic class of an end-user application of an associated mobile station. Hence, instead of receiving the QoS attribute, the BSC may determine the QoS attribute itself.

Figure 12:
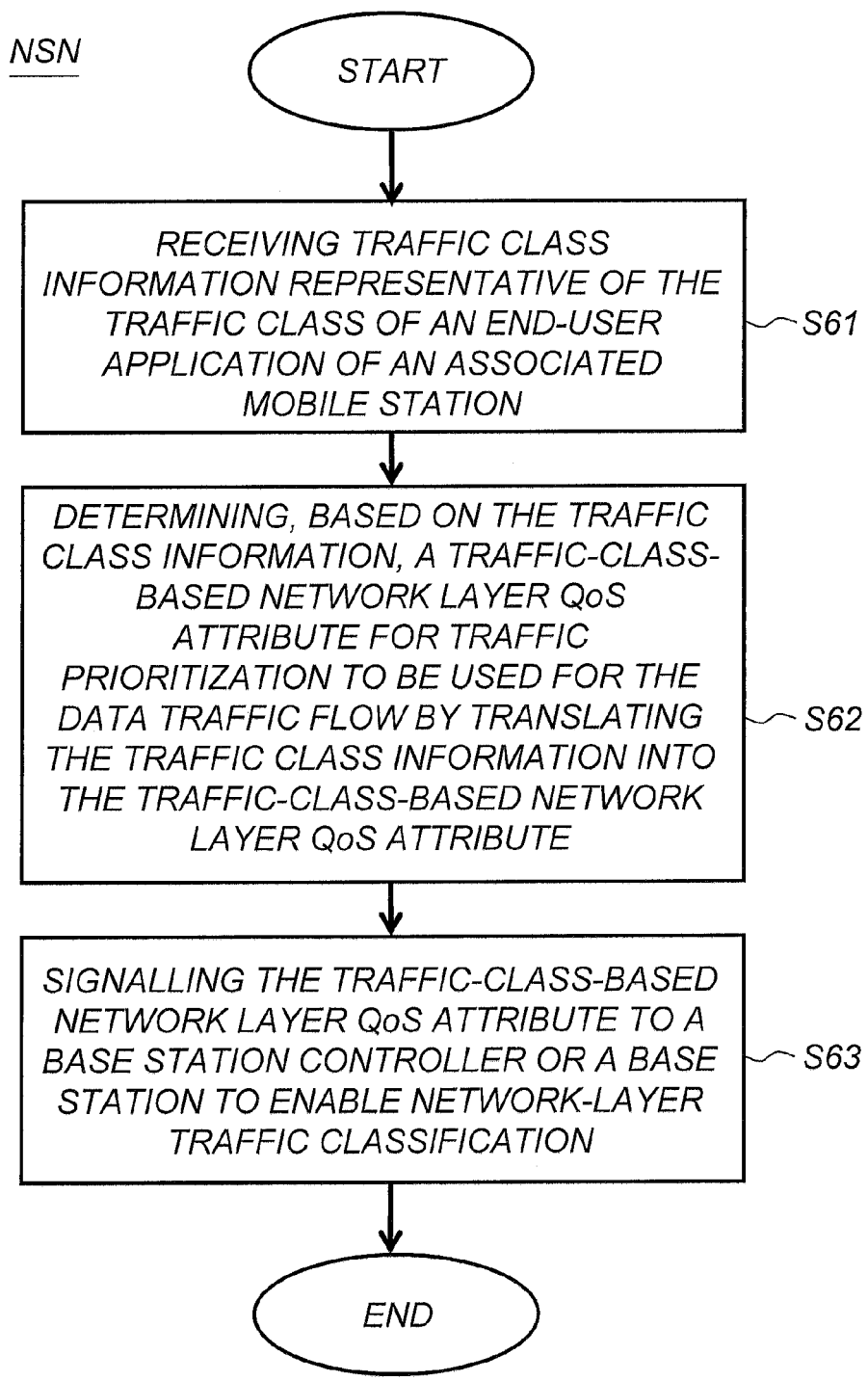
FIG. 12 is a flow chart showing an example of a method, in a network support node, of supporting traffic classification for a data traffic flow in a transport network according to an embodiment.

As schematically illustrated in FIG. 12, there is provided a method, performed by a network support node part of a GSM/EDGE Radio Access Network, GERAN, of supporting traffic classification for a data traffic flow, related to a General Packet Radio Service, GPRS, or Enhanced General Packet Radio Service, EGPRS. The method comprises the step S61 of the network support node receiving traffic class information representative of the traffic class of an end-user application of an associated mobile station. The method also comprises the step S62 of the network support node determining, based on the traffic class information, a traffic-class-based network layer Quality of Service, QoS, attribute for traffic prioritization to be used for the data traffic flow by translating the traffic class information into the traffic-class-based network layer QoS attribute. The method further comprises the step S63 of the network support node signalling the traffic-class-based network layer QoS attribute to a base station controller or an associated base station to enable network-layer traffic classification for the data traffic flow.

In a particular embodiment of the method illustrated in FIG. 12, the traffic-class-based network layer QoS attribute includes a DiffServ Code Point, DSCP, value.

By way of example, the network support node is a Serving GPRS Support Node, SGSN, and the SGSN node signals a DiffServ Code Point, DSCP, value to the base station controller in a QoS profile for a given Packet Flow Context, PFC, identified by a Packet Flow Identifier, PFI.

In this way, DiffServ-based traffic classification is supported in GERAN.

In summary, the proposed technology provides and/or supports network-layer traffic classification for a data traffic flow in GERAN.

In particular, network-layer traffic classification for a data traffic flow can be effectuated by a GERAN base station by letting the base station obtain a traffic-class-based network layer QoS attribute for traffic prioritization and include the QoS attribute in data packets of the data packet flow.

The network support node such as a SGSN may receive traffic class information representative of the traffic class of an end-user application of an associated mobile station, and determine a traffic-class-based network layer QoS attribute based on this traffic class information. This can be done by translating the traffic class information into a traffic-class-based QoS attribute that is understandable on the network layer of a transport network. The network support node then signals the traffic-class-based network layer QoS attribute to a base station controller or an associated base station to enable network-layer traffic classification for the considered data traffic flow.

By translating traffic class information representative of the traffic class of an end-user application into a QoS attribute that is understandable on the network layer, such as a DiffServ Code Point, DSCP, value, a so-called cross-layer mechanism is provided to enable network-layer traffic classification in the BSS system, and in the base station in particular. In other words, traffic class information carried on a different level, i.e. the application layer, can be mapped to the network layer, such as layer 3 of the Open Systems Interconnection, OSI, model, and used there for traffic classification purposes. For example, the traffic-class-based network layer QoS attribute may be used on the Internet Protocol, IP, layer in an all-IP based radio base station for classifying data packets of a given data traffic flow.

As will be understood, the base station may obtain the traffic-class-based network layer QoS attribute in at least two ways; for example by receiving the QoS attribute from a base station controller, BSC, or a network support node such as a SGSN. Alternatively, the base station determines the traffic-class-based network layer QoS attribute itself based on traffic class information representative of the traffic class of an end-user application of an associated mobile station. The base station then includes the obtained QoS attribute in data packets of the considered data traffic flow to provide network-layer traffic classification. In other words, the present technology thus introduces QoS handling on the network layer in the base station.

Similarly, the base station controller may obtain the traffic-class-based network layer QoS attribute in at least two ways; for example by receiving the QoS attribute from a network support node such as a SGSN. The base station controller may also modify the received QoS attribute according to local settings.

Alternatively, the base station controller determines the traffic-class-based network layer QoS attribute itself based on traffic class information representative of the traffic class of an end-user application of an associated mobile station. The base station controller then signals the QoS attribute to a base station to enable network-layer traffic classification for the considered data traffic flow.

It is also possible for the base station controller to apply the obtained QoS attribute by including it in data packets of the considered data traffic flow to provide network-layer traffic classification.

Figure 21:
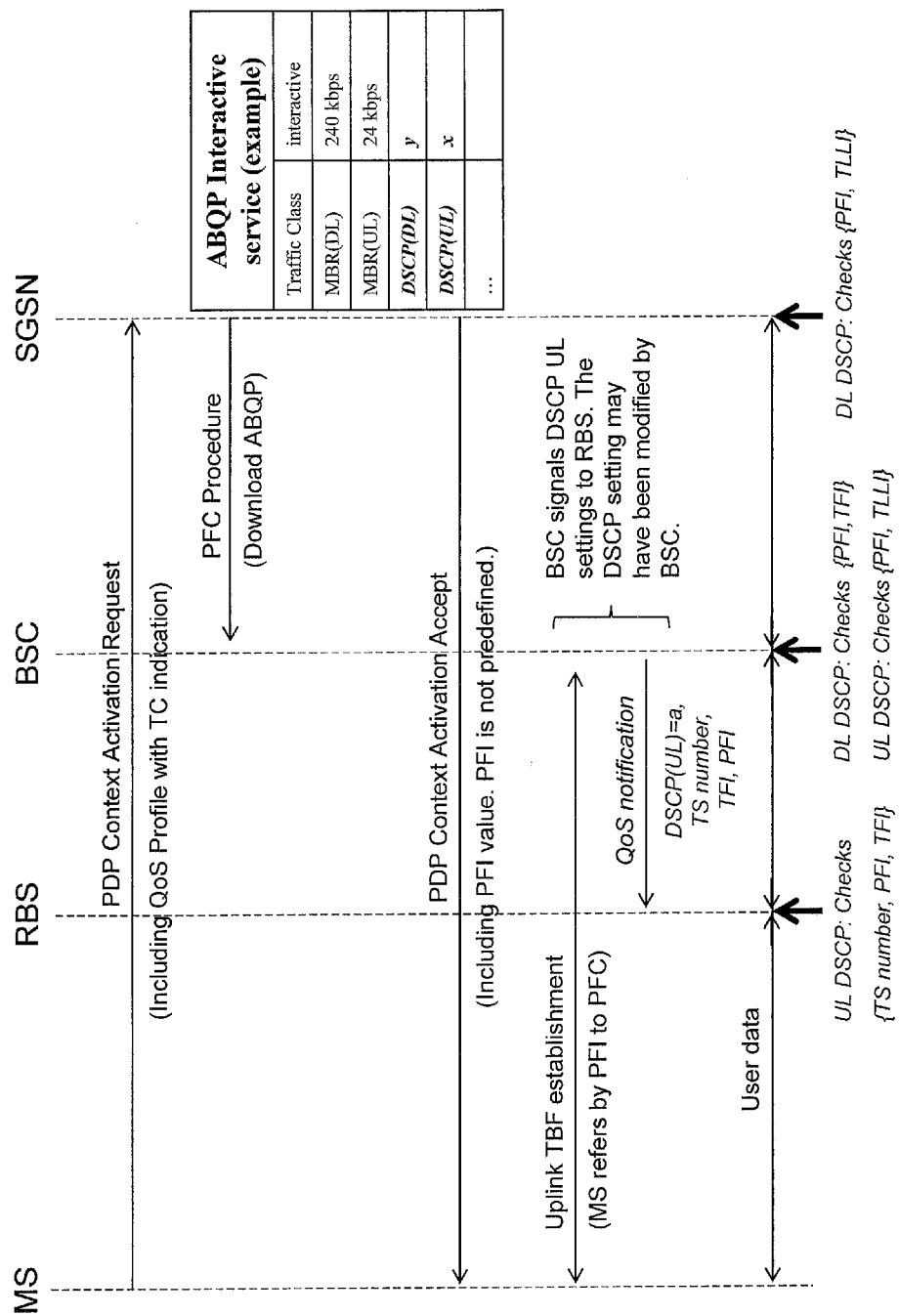
FIG. 21 is a schematic illustration of an example of PDP context activation and QoS profile negotiation according to an embodiment.

FIG. 21 is a schematic illustration of an example of PDP context activation and QoS profile negotiation according to an embodiment. The figure describes the flow of messages being exchanged to be able to map the correct DSCP values in uplink (UL) and downlink (DL) directions in the indicated network nodes such as RBS, BSC and GSN. However, both UL and DL is not valid in all these nodes. This is because of the fact that the RBS has IP connection only uplink, and therefore only UL DSCP is used. On the other end of the system, in the GSN, only DL DSCP is applied.

The bottom part of FIG. 21 describes what information is needed for the RBS, BSC and GSN to identify a user's data stream UL and/or DL, so the given node is able to identify the corresponding DSCP value in the required direction.

Obtaining DSCP values to be used UL/DL is based on the following sets of identifiers:

PFI: Packet flow Identifier. Identifies a packet flow. Assigned by the BSC.

TFI: Temporary Flow Identifier. Identifies a block of flow within a packet flow. This is an identifier of rather a short term burst of data coming from the MS (as long as the MS has something to "tell" to the SGSN).

TFI+PFI identifies in the BSC which ABQP shall be looked up that contains the assigned QoS profile.

TS: the timeslot the packet data channel (PDCH) is assigned to over the air. A user may use more than 1 of such channels. Which channel is used must be identified to properly identify the user a certain dataflow is coming from.

TLLI: Temporary Logic Link Identifier provides the signalling address used for communication between the MS and the SGSN.

It should be noted that over the interface between the GSN and the BSC the {PFI, TLLI} tuple is used. Over the interface between the RBS and the BSC the {PFI, TFI} tuple identifies a packet data corresponding to a given user. The RBS will, however, need the TS number as an additional identifier, since the ABQP is not known here.

RBS UL: the RBS must check the PFI and TFI values and the timeslot (TS) number the data was received from. This will identify for the RBS what DSCP shall be used for this given data packet in uplink (UL).

BSC UL: if the BSC receives something from the RBS, it checks the PFI and TLLI for the packet and based on this identifies the DSCP that shall be used to label the IP packet containing the user data before it sends uplink towards the GSN.

BSC DL: if the BSC receives something from the GSN, it checks the PFI and TFI for the packet and based on this identifies the DSCP that shall be used to label the IP packet containing the user data before it sends downlink towards the RBS.

GSN DL: if the GSN wants to send data to a certain user via a BSC, it checks the PFI and TLLI for the packet and based on this identifies the DSCP that shall be used to label the IP packet containing the user data before it sends downlink towards the BSC.

As an example, the BSC and the GSN are aware of the QoS profile. QoS profile points to how radio resources shall be handled in the BSC/BTS as well as some scheduling issues to meet the bandwidth and delay requirements described by the QoS profile. However, this has nothing to do with how the network layer understands the QoS. The ideas of the present invention map the traffic class indicated in the QoS profile to a DSCP value that is meaningful for the IP layer. In conventional systems of today, the BSC knows everything since the BTS is "stupid" and is not usually a node in the IP layer.

Figure 13:
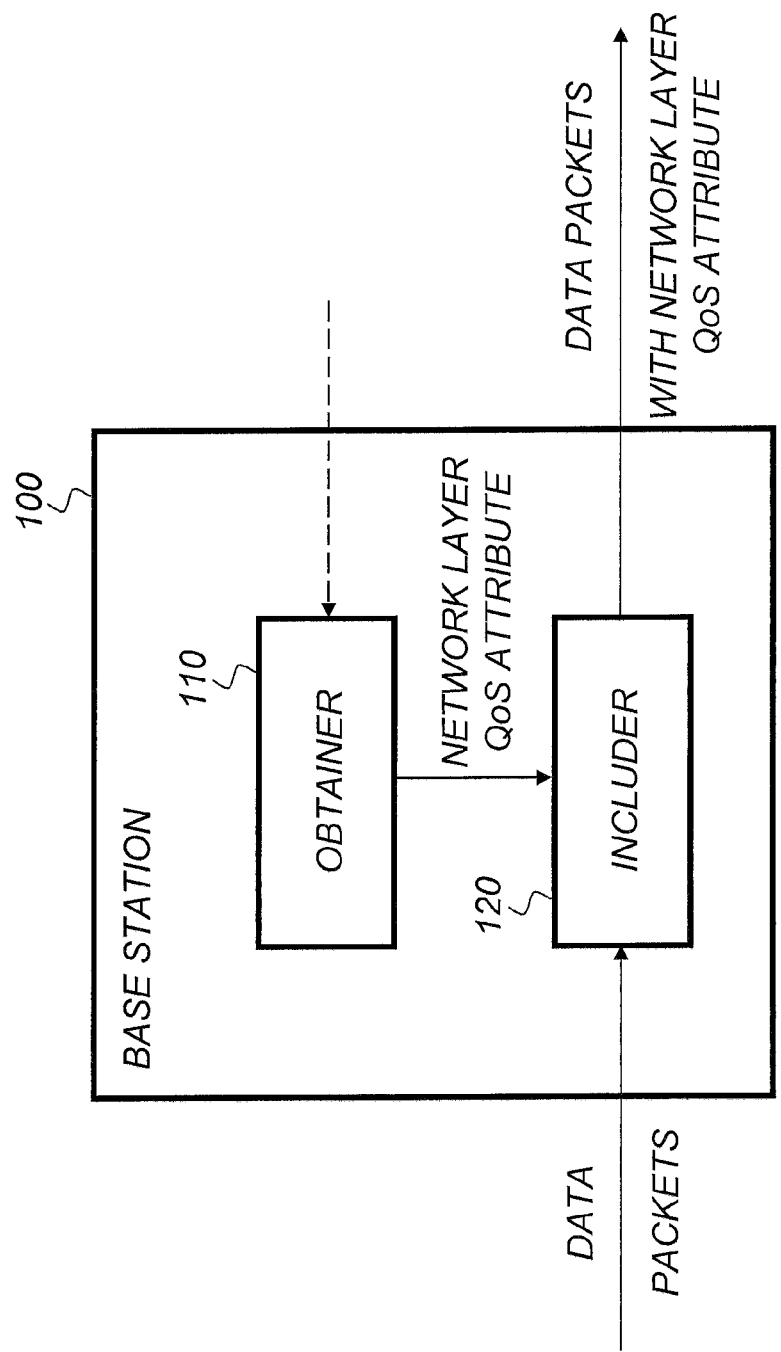
FIG. 13 is a block diagram of an example of a base station for providing traffic classification for a data traffic flow in a transport network according to an embodiment.

QoS notification message comes from the BSC. That is, it remains in the same QoS domain. When the BSC receives something from the SGSN and if other DSCP settings are valid in the MS-RAN domain, the BSC may remap the DSCP values which were received from the SGSN to other DSCP values. That is, it remaps to values which are valid locally in the MS-RAN domain Examples of Implementations As schematically illustrated in FIG. 13, there is also provided a base station 100 in a GSM/EDGE Radio Access Network, GERAN. The base station is configured to provide traffic classification for a data traffic flow, related to a General Packet Radio Service, GPRS, or Enhanced General Packet Radio Service, EGPRS. The base station 100 comprises an obtainer 110 configured to obtain, for the data traffic flow, a traffic-class-based network layer Quality of Service, QoS, attribute for traffic prioritization. The base station 100 also comprises an includer 120 configured to include the traffic-class-based network layer QoS attribute in data packets of the data traffic flow to provide network-layer traffic classification for the data traffic flow.

In a particular embodiment of the base station 100 illustrated in FIG. 13, the traffic-class-based network layer QoS attribute includes a DiffServ Code Point (DSCP) value. In this way, DiffServ-based traffic classification is provided in the base station.

Figure 14:
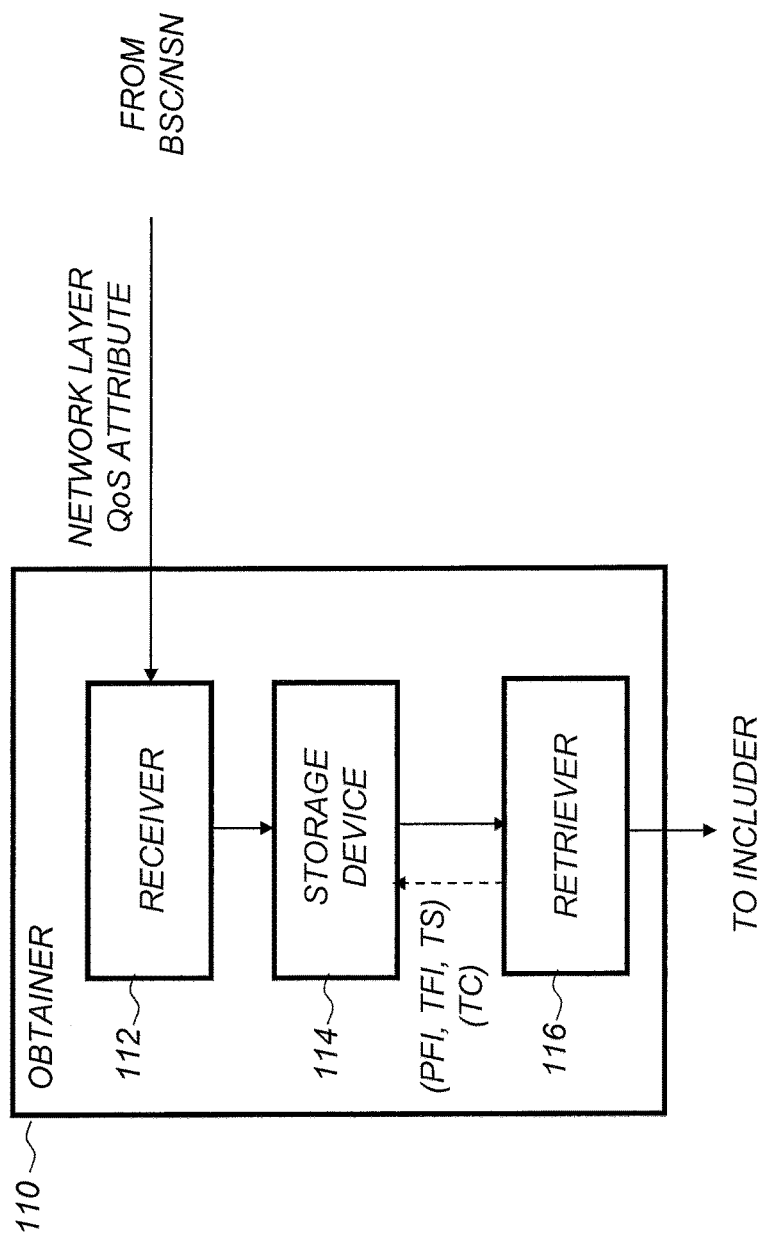
FIG. 14 is a block diagram of a particular example of the obtainer in FIG. 13 according to an embodiment.

FIG. 14 is a block diagram showing a particular example of the obtainer 110 in FIG. 13 according to an embodiment. In this particular example, the obtainer 110 comprises a receiver 112 configured to receive the traffic-class-based network layer QoS attribute for the data traffic flow from the base station controller or a network support node. The obtainer 110 in this embodiment also comprises a storage device 114 configured to store the traffic-class-based network layer QoS attribute to be used for the data traffic flow. The obtainer 110 in this embodiment also comprises a retriever 116 configured to retrieve the stored traffic-class-based network layer QoS attribute for including the traffic-class-based network layer QoS attribute in the data packets of the data traffic flow.

In a particular example embodiment, the retriever 116 in FIG. 14 is configured to retrieve the stored traffic-class-based network layer QoS attribute based on a set of information identifying the data traffic flow. This set of information identifying the data traffic flow includes, for an uplink data traffic flow, a Packet Flow Identifier (PFI), a Temporary Flow Identifier (TFI), and at least one Time Slot (TS) number.

In another particular example embodiment, the retriever 116 in FIG. 14 is configured to retrieve the stored traffic-class-based network layer QoS attribute based on traffic class information obtained from a length indicator (LI) field in a GPRS or EGPRS Radio Link Control Data Block, where the traffic class information is representative of the traffic class of an end-user application of an associated mobile station.

Figure 15:
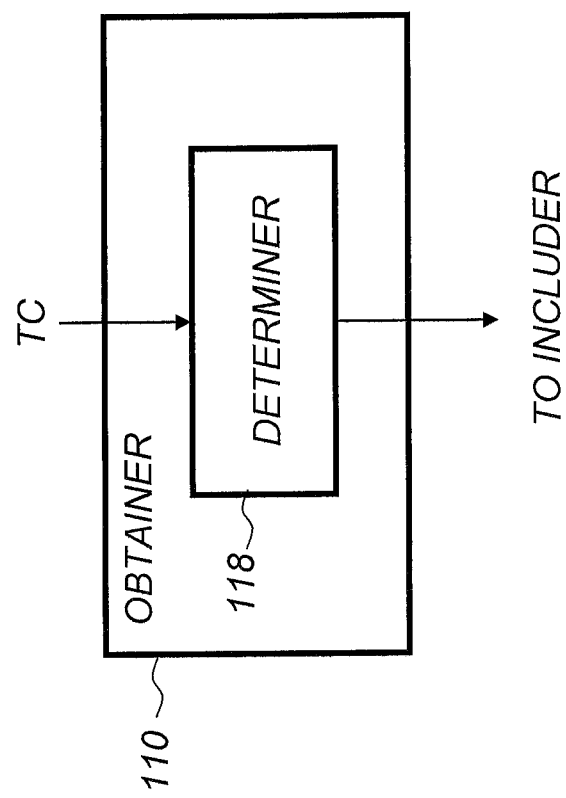
FIG. 15 is a block diagram of another particular example of the obtainer in FIG. 13 according to an embodiment.

FIG. 15 is a block diagram showing a particular example of the obtainer 110 in FIG. 13 according to an embodiment. In this particular example, the obtainer 110 comprises a determiner 118 configured to determine the traffic-class-based network layer QoS attribute for the data traffic flow based on traffic class information representative of the traffic class of an end-user application of an associated mobile station. Hence, instead of receiving the QoS attribute, the base station may determine the QoS attribute itself.

Figure 16:
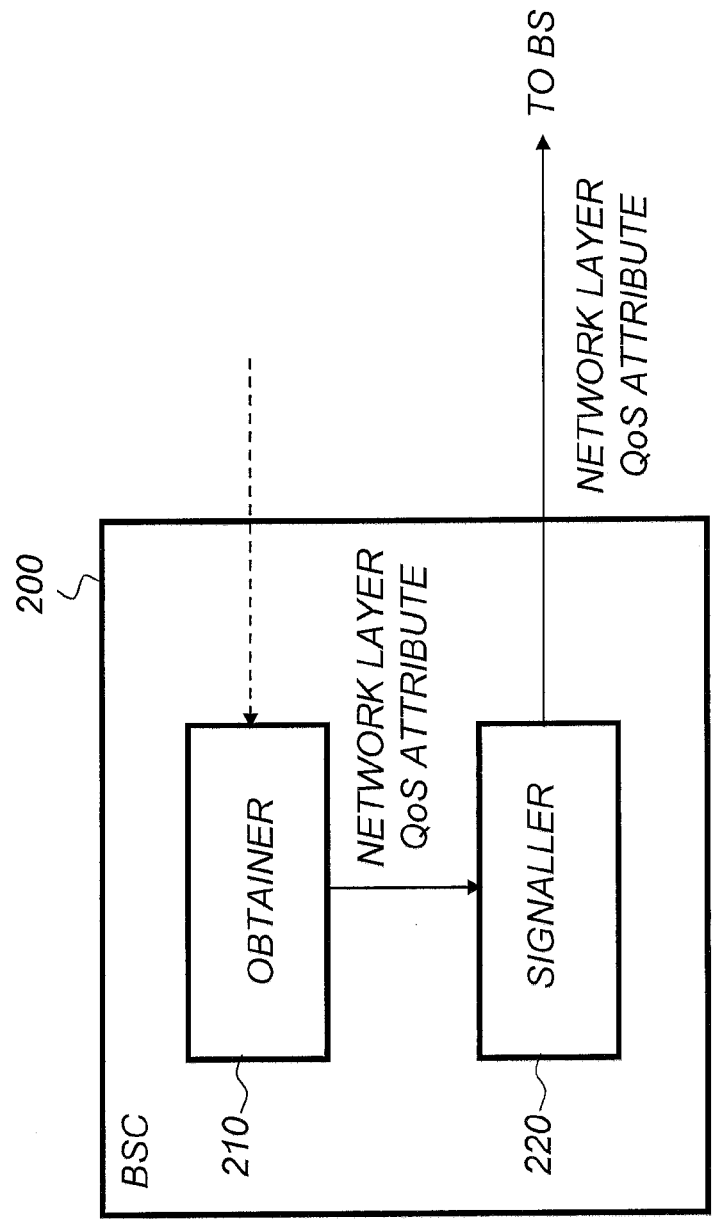
FIG. 16 is a block diagram of an example of a base station controller for supporting traffic classification for a data traffic flow in a transport network according to an embodiment.

As schematically illustrated in FIG. 16, there is also provided a base station controller 200 in a GSM/EDGE Radio Access Network, GERAN. The base station controller is configured to support traffic classification for a data traffic flow, related to a General Packet Radio Service, GPRS, or Enhanced General Packet Radio Service, EGPRS. The base station controller 200 comprises an obtainer 210 configured to obtain a traffic-class-based network layer Quality of Service, QoS, attribute for traffic prioritization to be used for the data traffic flow. The base station controller 200 also comprises a signaller 220 configured to signal the traffic-class-based network layer Quality of Service, QoS, attribute to a base station to enable network-layer traffic classification for the data traffic flow.

In a particular embodiment of the base station controller 200 illustrated in FIG. 16, the traffic-class-based network layer QoS attribute includes a DiffServ Code Point (DSCP) value. In this way, DiffServ-based traffic classification is provided and/or supported.

Figure 17:
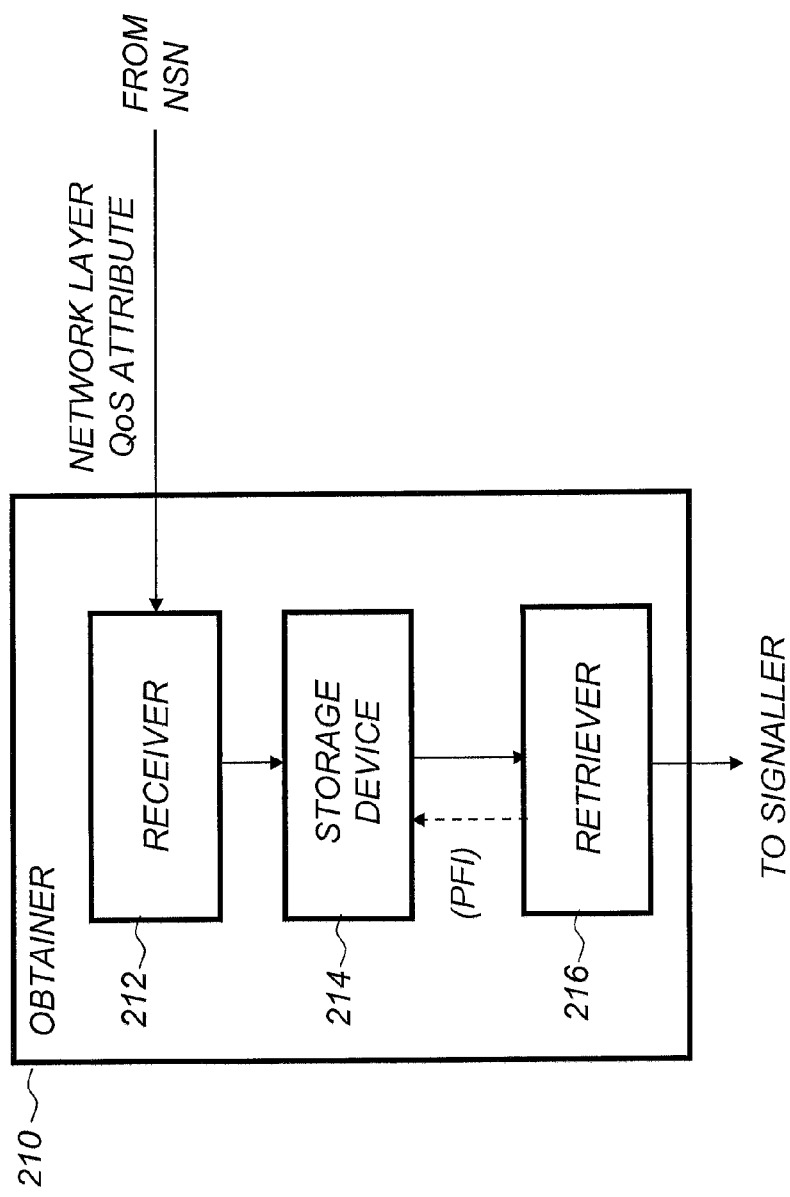
FIG. 17 is a block diagram of a particular example of the obtainer in FIG. 16 according to an embodiment.

FIG. 17 is a block diagram showing a particular example of the obtainer 210 in FIG. 16 according to an embodiment. In this particular example, the obtainer 210 comprises a receiver 212 configured to receive said traffic-class-based network layer QoS attribute from a network support node for a given Packet Flow Context, PFC, for the data traffic flow. The obtainer 210 in this embodiment also comprises a storage device 214 configured to store the traffic-class-based network layer QoS attribute for the PFC. The obtainer 210 in this embodiment also comprises a retriever 216 configured to retrieve, based on a Packet Flow Identifier, PFI, related to said PFC, the traffic-class-based network layer QoS attribute for signalling to the base station.

Figure 18:
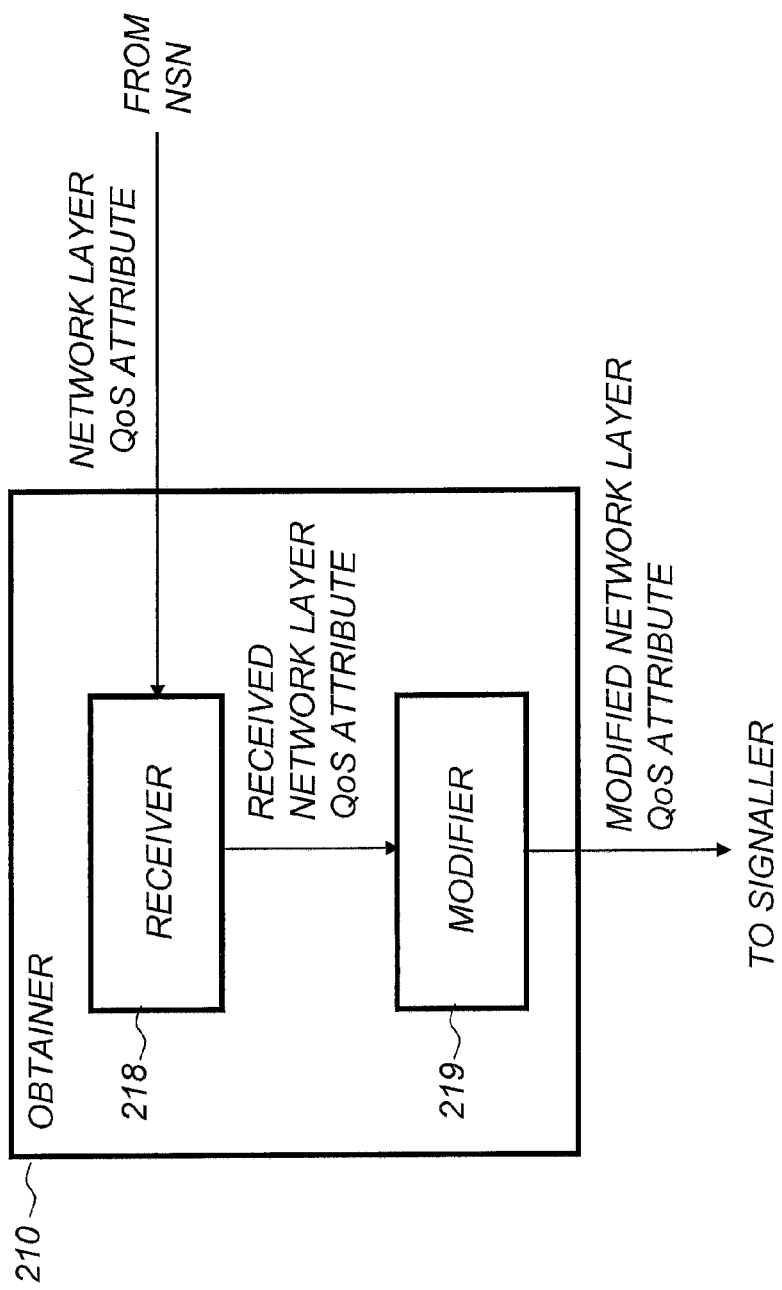
FIG. 18 is a block diagram of another particular example of the obtainer in FIG. 16 according to an embodiment.

FIG. 18 is a block diagram showing a particular example of the obtainer 210 in FIG. 16 according to an embodiment. In this particular example, the obtainer 210 comprises a receiver 218 configured to receive the traffic-class-based network layer QoS attribute from a network support node for a given Packet Flow Context, PFC, for the data traffic flow. The obtainer 210 in this embodiment also comprises a modifier 219 configured to modify the received traffic-class-based network layer QoS attribute according to local QoS settings valid for the radio access network managed by the base station controller, for signalling the modified traffic-class-based network layer QoS attribute to the base station.

In a particular example embodiment, the signaller 220 in FIG. 16 is configured to signal the traffic-class-based network layer Quality of Service, QoS, attribute in association with a set of information identifying the data traffic flow. This set of information identifying the data traffic flow includes, for an uplink data traffic flow, a Packet Flow Identifier (PFI), a Temporary Flow Identifier (TFI), and at least one Time Slot (TS) number.

In another particular example embodiment, the signaller 220 is configured to signal said traffic-class-based network layer Quality of Service, QoS, attribute in association with traffic class information representative of the traffic class of an end-user application of an associated mobile station. In this embodiment the base station controller 200 is configured to receive the traffic class information in a length indicator (LI) field in a GPRS or EGPRS Radio Link Control Data Block.

Figure 19:
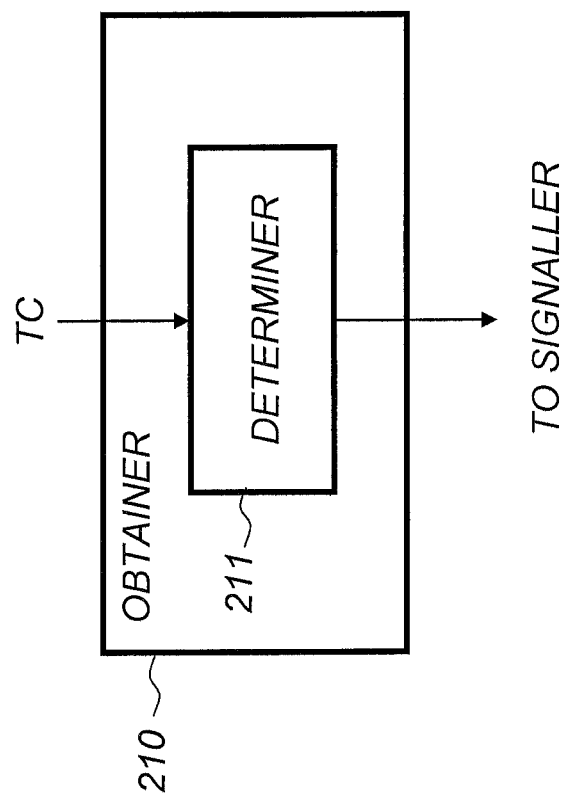
FIG. 19 is a block diagram of yet another particular example of the obtainer in FIG. 16 according to an embodiment.

FIG. 19 is a block diagram showing a particular example of the obtainer 210 in FIG. 16 according to an embodiment. In this particular example, the obtainer 210 comprises a determiner 211 configured to determine said traffic-classbased network layer Quality of Service, QoS, attribute for traffic prioritization based on traffic class information representative of the traffic class of an end-user application of an associated mobile station.

Figure 20:
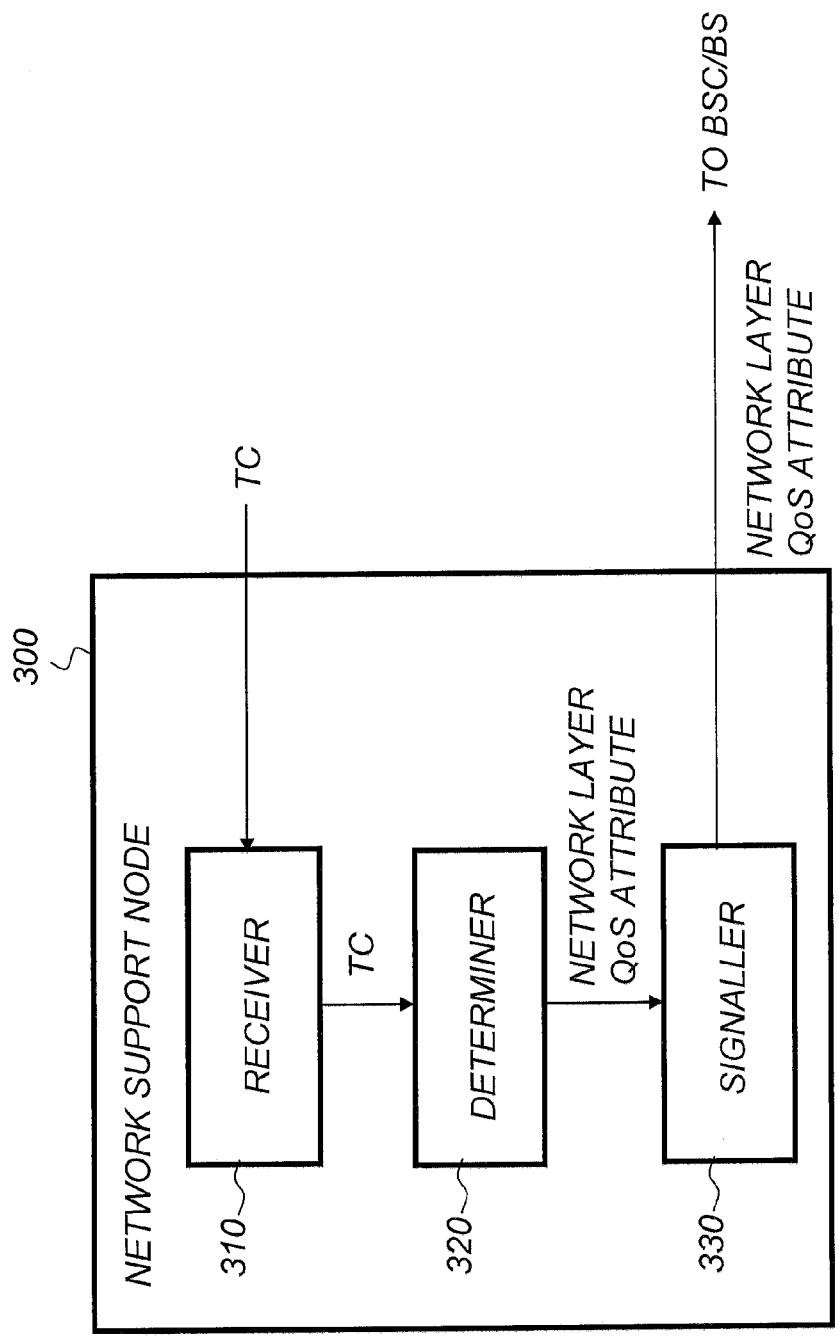
FIG. 20 is a block diagram of an example of a network support node for supporting traffic classification for a data traffic flow in a transport network according to an embodiment.

As schematically illustrated in FIG. 20, there is also provided a network support node 300 part of a GSM/EDGE Radio Access Network, GERAN. The network support node 300 is configured to support traffic classification for a data traffic flow, related to a General Packet Radio Service, GPRS, or Enhanced General Packet Radio Service, EGPRS. The network support node 300 comprises a receiver 310 configured to receive traffic class information representative of the traffic class of an end-user application of an associated mobile station. The network node 300 also comprises a determiner 320 configured to determine, based on the traffic class information, a traffic-class-based network layer Quality of Service, QoS, attribute for traffic prioritization to be used for the data traffic flow by translating the traffic class information into the traffic-class-based network layer QoS attribute. The network support node 300 further comprises a signaller 330 configured to signal the traffic-class-based network layer QoS attribute to a base station controller or an associated base station to enable network-layer traffic classification for the data traffic flow.

In a particular embodiment of the network support node 300 illustrated in FIG. 20, the traffic-class-based network layer QoS attribute includes a DiffServ Code Point (DSCP) value.

In a particular embodiment, the network support node 300 is a Serving GPRS Support Node, SGSN, and the SGSN node is configured to signal the DiffServ Code Point, DSCP, value to the base station controller in a QoS profile for a given Packet Flow Context, PFC, identified by a Packet Flow Identifier, PFI.

In this way, DiffServ-based traffic classification is supported.

In the following, a number of non-limiting examples of illustrative embodiments are described. In the examples presented below it is assumed that the traffic-class-based network layer QoS attribute is a DiffServ Code Point (DSCP) value.

The goal of the invention is to provide DiffServ PHB-based traffic differentiation and classification of (E)GPRS data traffic over the 3GPP Radio Access Bearer Service for uplink data flow.

Network layer classification of data traffic is based on the type of traffic the end-user application generates.

In uplink direction (from the MS to the GSN node) it is the first IP connectivity point to the IP RAN (RBS) that performs the network layer classification of the data traffic based on traffic classification of the MS and signaled DSCP to Traffic Class mapping.

Traffic Class to DSCP Mapping

The first IP connectivity point to the IP RAN transport network (for example the RBS) shall be aware of what data type the end-user application generates uplink. Based on this information and based on DSCP to Traffic Class (TC) mapping information the RBS is capable to label different data traffic types with the proper DiffServ Code Points.

DSCP to TC mapping can either be signaled to the RBS from the SGSN via the BSC or otherwise can be pre-configured in the RBS node. In case this information is signaled from the SGSN, this may require new signalling messages during the Temporary Block Flow (TBF) assignment or reconfiguration procedure.

Signalling of Traffic Class

The MS signals the SGSN during PDP Context Activation Procedure the TC to be used by the end-user application.

Solution A

Traffic type information is carried by the (E)GPRS RLC Uplink Data Block in a new special Length Indicator field value. Based on this LI value the RBS can assign the required DSCP value to the packets.

In Table 1 the proposed new QoS LI values are shown in bold text.

TABLE 1

Changes in Table 10.4.14a.1 "Interpretation of values of LI field and E bit" in 3GPP TS 44.060.

| Value of LI in a RLC data block | Value of E bit in the same octet | Interpretation |
|---|---|---|
| k-th LI (k > 0 integer):<br>0 < value < 75 (EGPRS except EGPRS2-A downlink)<br>0 < value < 83 (EGPRS2-A downlink)<br>0 < value < 104 (TCH) | 0 | The value of the k-th LI is the number of octets of the k-th Upper Layer PDU, or the last segment of it, in the current RLC data block.<br>There is at least one Upper Layer PDU following the k-th Upper Layer PDU in the current RLC data block. |
|  | 1 | There is no more than one Upper Layer PDU following the k-th Upper Layer PDU in the current RLC data block. |
| 1$^{st}$ LI: value = 0 | 0 | The last Upper Layer PDU of the previous in sequence RLC data block ends at the boundary of that RLC data block and it has no LI in the header of that RLC data block. Thus the current RLC data block contains the first segment of all included Upper Layer PDUs. |
| 1$^{st}$ LI: value = 126 | 0 | The current RLC data block contains the first segment of all included Upper Layer PDUs. |
| k-th LI (k > 1 integer):<br>0 < value < 75 (EGPRS except EGPRS2-A downlink) |  | The k-th LI contains the number of octets of the (k − 1)-th Upper Layer PDU in the current RLC data block. |

TABLE 1-continued

Changes in Table 10.4.14a.1 "Interpretation of values of LI field and E bit"
in 3GPP TS 44.060.

| Value of LI in a RLC data block | Value of E bit in the same octet | Interpretation |
|---|---|---|
| 0 < value < 83 (EGPRS2-A downlink) 0 < value < 104 (TCH) | 0 | There is at least one Upper Layer PDU following the (k − 1)-th Upper Layer PDU in the current RLC data block. |
| | 1 | There is no more than one Upper Layer PDU following the (k − 1)-th Upper Layer PDU in the current RLC data block. |
| k-th LI: value = 127 | 1 | The octets between the end of the Upper Layer PDU indicated by the (k − 1)-th LI and the end of the current RLC data block are filling octets, |
| 1$^{st}$ LI: value = 0 | 1 | The previous RLC data block contains a Upper Layer PDU, or a part of it, that fills precisely the previous data block and for which there is no length indicator in that RLC data block. The current RLC data block contains a Upper Layer PDU that either fills the current RLC data block precisely or continues in the next RLC data block. |
| 1$^{st}$ LI: value = 126 | 1 | The current RLC data block contains the first segment of an Upper Layer PDU that either fills the current RLC data block precisely or continues in the next RLC data block. |
| 1$^{st}$ LI: value = 127 (Iu mode only) | 1 | All octets of the RLC Data block contain filling information. |
| k-th LI: value = 125 | 0/1 | The current RLC data block contains the dynamic timeslot reduction control information. |
| k-th LI: value = 124 (this value is only allowed if EMSR is enabled) | 0 | An LI value of 124 serves as a TFI transition indicator and is immediately followed by an octet containing the TFI associated with the next Upper Layer PDU segment in bit positions 1 to 5 (where bit 5 is the most significant bit) and reserved bits in bit positions 6 to 8. |
| 1$^{st}$ LI: value = 123 (this value is only allowed if network sharing is supported both by the network and the mobile station) | 0/1 | An LI value of 123 serves as a Selected PLMN Index field indicator and is immediately followed by an octet that contains the Selected PLMN Index field (see sub-clause 10.4.27). |
| 1st LI value = 122 | 0/1 | QoS Class Conversational |
| 1st LI value = 121 | 0/1 | QoS Class Streaming |
| 1st LI value = 120 | 0/1 | QoS Class 2 Interactive |
| 1st LI value = 119 | 0/1 | QoS Class Background |
| 'No LI field present | n.a. | The Upper Layer PDU that starts with the current RLC data block either fills the current RLC data block precisely or continues in the following in-sequence RLC data block |

In this solution the MS obtains the TC during the PDP Context Activation Procedure from the SGSN. During uplink packet transfer the MS only needs to map the applicable TC to a standardized LI value.

Using a specific new Length Indicator field value provides backward compatibility to MSs not supporting this method. Traffic from these equipments may be mapped to any preferred traffic class in the network layer.

Solution B

The MS indicates the applied Traffic Class to the SGSN in Activate PDP Context Procedure. Based on this request the SGSN assigns a Packet Flow Id (PFI) to the PDP Context. In the Activate PDP Context Accept message the SGSN sends the PFI to the MS.

Since the selected PFI is not within the pre-defined range (it is assigned dynamically) and if the BSS (BSC) does not have yet the BSS QoS Profile for the given PDP context, it downloads the Aggregate BSS QoS Profile (ABQP) from the SGSN. As one possible solution during this BSS Packet Flow Context Procedure the SGSN tells the BSS (BSC) the TC to DSCP mapping. Other solution may be that the BSC decides upon the TC to DSCP mapping.

Upon the MS requests a radio connection (TBF) from the BSC which includes the PFI value, the BSC signals the assigned DSCP value that shall be used for this given TBF and Traffic Class that is addressed by the received PFI down to the RBS. This signalling message shall include also the TSs assigned to the given TBF.

Based on the PFI value and the TC to DSCP mapping, the RBS labels the IP uplink data packets with the appropriate DSCP values.

The present technology offers at least some of the following advantages:
  Provides network layer QoS over the 3GPP Radio Access Bearer Services by giving meaning of traffic class information of an end-user application to the network layer.
  Enables (E)GPRS service traffic to better cope with traffic originating from other radio standards.

Allows (E)GPRS service traffic to be handled properly over the transport network according to the given traffic class demands.

Provides more accurate QoS profile negotiation by involving the base station in the overall procedure.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method, performed by a base station in a GSM/EDGE Radio Access Network (GERAN), of providing traffic classification for a data traffic flow related to a General Packet Radio Service (GPRS) or Enhanced General Packet Radio Service (EGPRS), wherein said method comprises the steps of:

receiving, for said data traffic flow, a traffic-class-based network layer Quality of Service (QoS) attribute for traffic prioritization from a base station controller or a network support node, wherein said traffic-class-based network layer QoS attribute includes a DiffServ Code Point (DSCP) value and is understandable on a network layer of a transport network;

storing the received traffic-class-based network layer QoS attribute;

subsequently retrieving the stored traffic-class-based network layer QoS attribute; and including said retrieved traffic-class-based network layer QoS attribute in data packets of said data traffic flow to provide network-layer traffic classification for said data traffic flow, wherein said traffic-class-based network layer QoS attribute is retrieved based on a set of information identifying said data traffic flow, wherein said set of information identifying said data traffic flow includes at least one of, for an uplink data traffic flow, a Packet Flow Identifier (PFI), a Temporary Flow Identifier (TFI), and at least one Time Slot (TS) number and traffic class information comprising a length indicator (LI) field in a GPRS or EGPRS Radio Link Control Data Block, wherein said traffic class information is representative of the traffic class of an end-user application of an associated mobile station, and wherein said traffic-class-based network layer QoS attribute previously being assigned with reference to said set of information by said base station controller.

* * * * *